(12) United States Patent
Utsubo et al.

(10) Patent No.: US 8,488,139 B2
(45) Date of Patent: Jul. 16, 2013

(54) IMAGE FORMING APPARATUS WITH PRINT RESTRICTION LEVELS

(75) Inventors: Yoshiaki Utsubo, Tokyo (JP); Tomio Tanaka, Fukushima-ken (JP)

(73) Assignee: Oki Data Corporation, Tokyo (JP)

( * ) Notice: Subject to any disclaimer, the term of this patent is extended or adjusted under 35 U.S.C. 154(b) by 936 days.

(21) Appl. No.: 12/292,129

(22) Filed: Nov. 12, 2008

(65) Prior Publication Data

US 2009/0122347 A1   May 14, 2009

(30) Foreign Application Priority Data

Nov. 13, 2007 (JP) ................................. 2007-294732

(51) Int. Cl.
*G06K 15/00* (2006.01)

(52) U.S. Cl.
USPC ....... 358/1.14; 358/1.13; 358/1.15; 358/1.16; 347/5; 347/14; 726/7; 726/19; 726/21

(58) Field of Classification Search
USPC .................. 358/1.13, 1.14, 1.15, 1.16; 347/5, 347/14; 726/7, 19, 21, 26–31
See application file for complete search history.

(56) References Cited

U.S. PATENT DOCUMENTS

| | | | | |
|---|---|---|---|---|
| 6,807,388 B1 * | 10/2004 | Kojima et al. | .................. | 399/80 |
| 2007/0101420 A1 * | 5/2007 | Masui | .............. | 726/10 |
| 2007/0229873 A1 * | 10/2007 | Kato | ............ | 358/1.14 |
| 2007/0253014 A1 * | 11/2007 | Nakata | ......... | 358/1.14 |

FOREIGN PATENT DOCUMENTS

| | | |
|---|---|---|
| JP | 2002-215372 A | 8/2002 |
| JP | 2007-241741 | 9/2007 |
| JP | 2007-293703 A | 11/2007 |
| WO | WO-2006/095879 A1 | 9/2006 |
| WO | WO 2006095879 A1 * | 9/2006 |

* cited by examiner

*Primary Examiner* — Jacky X Zheng
(74) *Attorney, Agent, or Firm* — Rabin & Berdo, P.C.

(57) ABSTRACT

An image forming apparatus places restriction on a print job. A memory stores a plurality of items of first print job information and corresponding print restriction levels. A print job information obtaining section obtains a plurality of items of second print job information from the print job. A restriction level selecting section reads the print restriction levels from the memory by using the items of second print information. The restriction level selecting section selects the highest one of the print restriction levels. A printing section prints print data contained in the print job at the selected highest one of the print restriction levels. The second print restriction levels may be lower in restriction level than the first print restriction levels. The user may be advised of a third printing format if the highest one of the first print restriction levels indicates that the print job is restricted.

5 Claims, 27 Drawing Sheets

FIG.3

RESTRICTION STRUCTURE TABLE

| PRINT JOB INFORMATION | MAXIMUM ALLOWABLE NUMBER OF RESTRICTION TABLES | PRINT RESTRICTION LEVEL |
|---|---|---|
| USER NAME | 5000 | NOT RESTRICTED(1)/FORCED MONOCHROME PRINTING(2)/PRINTING NOT PERMITTED(3) |
| APPLICATION NAME | 200 | NOT RESTRICTED(1)/FORCED MONOCHROME PRINTING(2)/PRINTING NOT PERMITTED(3) |
| URL | 200 | NOT RESTRICTED(1)/FORCED MONOCHROME PRINTING(2)/PRINTING NOT PERMITTED(3) |

FIG.4A

| USER NAME | PRINT RESTRICTION LEVEL |
|---|---|
| NON-REGISTERED | 3 |
| USER#1 | 1 |
| USER#2 | 2 |
| USER#3 | 3 |

FIG.4B

| APPLICATION NAME | PRINT RESTRICTION LEVEL |
|---|---|
| NON-REGISTERED | 1 |
| APPLICATION#1 | 1 |
| APPLICATION#2 | 2 |
| APPLICATION#3 | 3 |

FIG.4C

| URL | PRINT RESTRICTION LEVEL |
|---|---|
| NON-REGISTERED | 1 |
| URL#1 | 2 |
| URL#2 | 3 |

FIG.5A
PRINT JOB "A"

USER NAME=USER#1
APPLICATION NAME=APPLICATION#1
URL="—"

PRINT DATA

FIG.5B
PRINT JOB "B"

USER NAME=USER#2
APPLICATION NAME=APPLICATION#3
URL="—"

PRINT DATA

FIG.6

| USER NAME | APPLICATION NAME | URL | THIRD PRINTING FORMAT |
|---|---|---|---|
| 1 | 1 | 1 | —(NON-REGISTERED) |
| 1 | 1 | 2 | 2UP PRINTING |
| 1 | 1 | 3 | THUMBNAIL PRINTING |
| 1 | 2 | 1 | 2UP PRINTING |
| 1 | 2 | 2 | 2UP PRINTING |
| 1 | 2 | 3 | THUMBNAIL PRINTING |
| 1 | 3 | 1 | THUMBNAIL PRINTING |
| 1 | 3 | 2 | THUMBNAIL PRINTING |
| 1 | 3 | 3 | THUMBNAIL PRINTING |
| 2 | 1 | 1 | 2UP PRINTING |
| 2 | 1 | 2 | 2UP PRINTING |
| 2 | 1 | 3 | THUMBNAIL PRINTING |
| 2 | 2 | 1 | 2UP PRINTING |
| 2 | 2 | 2 | 2UP PRINTING |
| 2 | 2 | 3 | THUMBNAIL PRINTING |
| 2 | 3 | 1 | THUMBNAIL PRINTING |
| 2 | 3 | 2 | THUMBNAIL PRINTING |
| 2 | 3 | 3 | THUMBNAIL PRINTING |
| 3 | 1 | 1 | —(NON-REGISTERED) |
| 3 | 1 | 2 | —(NON-REGISTERED) |
| 3 | 1 | 3 | —(NON-REGISTERED) |
| 3 | 2 | 1 | —(NON-REGISTERED) |
| 3 | 2 | 2 | —(NON-REGISTERED) |
| 3 | 2 | 3 | —(NON-REGISTERED) |
| 3 | 3 | 1 | —(NON-REGISTERED) |
| 3 | 3 | 2 | —(NON-REGISTERED) |
| 3 | 3 | 3 | —(NON-REGISTERED) |

FIG.7

| | MENU | ITEM+ | VALUE+ | SELECT |
|---|---|---|---|---|
| | ONLINE | ITEM− | VALUE− | CANCEL |

FIG.10

SELECTION OF HOW PRINTING SHOULD BE PERFORMED

FOLLOWING RESTRICTIONS ARE PLACED ON THIS PRINT JOB(JOB MANAGEMENT NUMBER XX)

| | PRINT RESTRICTIONS PLACED ON JOB | PRINT RESTRICTION | THIRD PRINTING FORMAT |
|---|---|---|---|
| USER NAME | NON-RESTRICTED | FORCED MONOCHROME PRINTING | 2UP PRINTING |
| APPLICATION NAME | FORCED MONOCHROME PRINTING | | |
| URL | NON-RESTRICTED | | |

~29

PLEASE SELECT ONE OF THE FOLLOWING OPTIONS ( PRINT IN ACCORDANCE WITH PRINT RESTRICTION )
( CANCEL PRINT JOB )
( PRINT IN THIRD PRINTING FORMAT )

APPLICATION RESTRICTION TABLE

| APPLICATION NAME | PRINTING PERMISSION FLAG | PRINTING PRIORITY FLAG |
|---|---|---|
| Microsoft Word | 3 | 3 |
| Internet Explorer | 0 | 3 |
| OTHER APPLICATIONS | 1 | 3 |
| | | |

USER RESTRICTION TABLE

| USER NAME | PRINTING PERMISSION FLAG | PRINTING PRIORITY FLAG |
|---|---|---|
| SMITH | 0 | 3 |
| FORD | 3 | 3 |
| OTHER USERS | 0 | 0 |
| | | |

DOCUMENT RESTRICTION TABLE

| DOCUMENT NAME | PRINTING PERMISSION FLAG | PRINTING PRIORITY FLAG |
|---|---|---|
| http://www.xxx.co.jp/ | 3 | 3 |
| OTHER DOCUMENTS | 0 | 3 |
|  |  |  |

NAME: [                    ]   [ADD/CHANGE]

PRINTING PERMISSION FLAG: [COLOR PRINTING ALLOWED ▼] ~251 / ~253   [DELETE]

PRINTING PRIORITY FLAG: [PRIORITY IS GIVEN TO COLOR PRINTING ▼] ~255   [TERMINATE]

◉ APPLICATION NAME  263a

| APPLICATION NAME | PRINTING PERMISSION FLAG | PRINTING PRIORITY FLAG |
|---|---|---|
| Internet Explorer | PRINTING NOT ALLOWED | PRIORITY IS GIVEN TO COLOR PRINTING |
| OTHER APPLICATIONS | COLOR PRINTING ALLOWED | PRIORITY IS GIVEN TO COLOR PRINTING |
|  |  |  |

257

○ USER NAME  263b

| APPLICATION NAME | PRINTING PERMISSION FLAG | PRINTING PRIORITY FLAG |
|---|---|---|
| OTHER APPLICATIONS | PRINTING NOT ALLOWED | PRINTING NOT ALLOWED |
|  |  |  |
|  |  |  |

259

○ DOCUMENT NAME  263c

| DOCUMENT NAME | PRINTING PERMISSION FLAG | PRINTING PRIORITY FLAG |
|---|---|---|
| http://www.xxx.co.jp/ | COLOR PRINTING ALLOWED | PRIORITY IS GIVEN TO COLOR PRINTING |
| OTHER DOCUMENTS | COLOR PRINTING ALLOWED | PRIORITY IS GIVEN TO COLOR PRINTING |
|  |  |  |

261

IMAGE FORMING APPARATUS WITH PRINT RESTRICTION LEVELS

BACKGROUND OF THE INVENTION

1. Field of the Invention

The present invention relates to an image forming apparatus and an information processing apparatus.

2. Description of the Related Art

Usage of image forming apparatuses may be restricted based on IP address and MAC address. Japanese Patent Publication No. 2007-241741 discloses one such image forming apparatus.

Specifically, an IP address or an MAC address is detected from print data received from a host apparatus. Printing is then restricted based on the detected IP address or MAC address. Printing all of the print data received from a particular IP address or MAC address is restricted regardless of the types of applications with which the print data is created. Thus, print data will be restricted even if it is created with an application accepted by the image forming apparatus. This presents a problem in effectively restricting printing of print jobs.

SUMMARY OF THE INVENTION

The present invention was made in view of the aforementioned drawbacks.

An object of the invention is to provide an image forming apparatus capable of ensuring print restrictions at a plurality of levels. Printing may be restricted at a plurality of levels while also ensuring effectively printing restriction.

An image forming apparatus places restriction on a print job in terms of user, application and URL. A memory stores a plurality of items of first print job information and corresponding print restriction levels. A print job information obtaining section obtains a plurality of items of second print job information from a print job. A restriction level selecting section reads the print restriction levels from the memory by using the plurality of items of second print information. The restriction level selecting section selects a highest one of the print restriction levels. A printing section prints print data contained in the print job at the selected highest one of the print restriction levels.

An image forming apparatus places restriction on user, application and URL. A restriction information storing section stores a plurality of items of first print job information, first print restriction levels corresponding to a plurality of items of first print job information, and second print restriction levels corresponding to the plurality of items of first print job information, the second print restriction levels being either equal to the first print restriction levels or less restrictive than the first print restriction levels. A print job information obtaining section obtains a plurality of items of second print job information from a print job. A restriction determining section makes a decision as to whether the print job should be printed, the decision being made based on the items of second print job information obtained by the print job information obtaining section, the first print restriction levels and the second print restriction levels. The printing section prints print data contained in the print job if the decision is that the print job should be printed.

An image processing apparatus places restriction on user, application and URL. A restriction information storing section stores a plurality of items of first print job information, first print restriction levels corresponding to a plurality of items of first print job information, and second print restriction levels corresponding to the plurality of items of first print job information, the second print restriction levels being either equal to the first print restriction levels or less restrictive than the first print restriction levels. A print job information obtaining section obtains a plurality of items of second print job information from a print job. A restriction determining section makes a decision as to whether the print job should be printed, the decision being made based on the items of second print job information obtained by the print job information obtaining section, the first print restriction levels and the second print restriction levels. A print data producing section produces print data based on the decision, the print data being produced from the print job. A transmitter transmits the print data to an external apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 3 illustrates a restriction structure table;

FIGS. 4A-4C illustrate examples of restriction level tables;

FIGS. 5A and 5B illustrate examples of print jobs having a user name and an application name;

FIG. 6 illustrates a printing format table;

FIG. 7 illustrates the operating panel;

FIG. 10 illustrates a screen that appears on a display device (not shown);

FIGS. 18-20 illustrate restriction tables;

FIG. 21 illustrates a screen that appears on a display device (not shown);

DETAILED DESCRIPTION OF THE INVENTION

Embodiments of the invention will be described in detail with reference to the accompanying drawings.

First Embodiment

Figure 1:
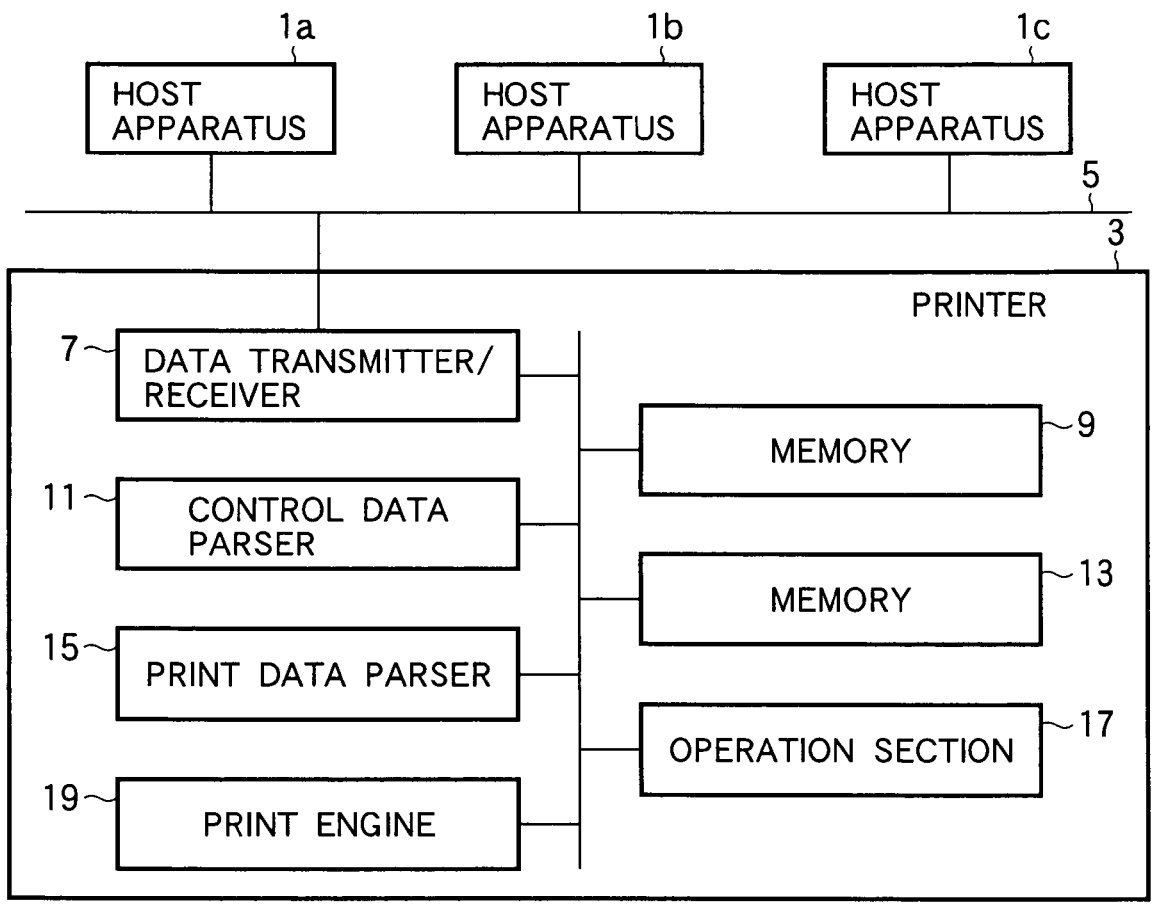
FIG. 1 illustrates an image forming apparatus and an information processing apparatus of a first embodiment.

FIG. 1 illustrates an image forming apparatus and an information processing apparatus of a first embodiment.

An image forming apparatus includes a plurality of host apparatuses 1a, 1b, and 1c connected to a printer 3 via a network 5. The host apparatuses 1a, 1b, 1c communicate various types of data with the printer 3 by the use of a bi-directional protocol. The host apparatuses 1a, 1b, and 1c incorporate corresponding application programs that create print data. A user creates and edits print data using an application program on the host apparatus, and sends the print data to the printer 3. In the following description, a host apparatus 1 refers to any one of the host apparatuses 1a, 1b, and 1c.

The printer 3 parses a print job received from the host apparatus 1 to determine whether restriction has been placed on the print job. If restriction has been placed, the printer 3 sends a specific content of the restriction, a reason for the restriction, and an alternative printing format. Then, if the user inputs information indicative of acceptance of the print restriction or a preferred one of printing formats acceptable to the user, the host apparatus 1 transmits the information to the printer 3. Upon receiving the information from the host apparatus 1, the printer 3 performs the process required for printing the print job.

The printer 3 includes the following sections for performing printing. A data transmitter/receiver 7 serves as an interface that communicates data and commands with the host apparatus 1. A memory 9 is in the form of, for example, a volatile memory. A control data parser 11 parses the control data of a print job. A memory 13 is in the form of, for example, a hard disc drive (HDD) A print data parser 15 parses print data. The user operates an operating panel 17 to input various commands and data into the printer 3. A print engine 19 performs printing of the print job.

Figure 2:
FIG. 2 illustrates job control data 21 and print data.

A data transmitter/receiver 7 serves as an interface between the printer 3 and the host apparatus 1. For example, the data transmitter/receiver 7 receives a print job from the host apparatus 1. The print job includes job control data 21 and print data 23 as shown in FIG. 2. The job control data 21 includes commands and print job information including a user name, application name, and a URL. The print job information identifies the type of a print job in terms of user name, application name, and a URL. The commands include a command that specifies the number of pages to be printed and a command that specify a paper tray, directly controlling the print data 23. The print data 23 is described in a page description language (PDL), and describes image data created by the user. The data transmitter/receiver 7 receives the print job from the host apparatus 1, and stores the print job into a memory 9. The data transmitter/receiver 7 transmits a specific restriction notification, which will be described in detail, to the host apparatus 1.

The memory 9 stores the print job received from the host apparatus 1. A print data parser 15 parses the print data of the print job to generate image data. The memory 9 also temporarily stores the image data generated by the print data parser 15.

A control data parser 11 parses the job control data contained in the print job and another job control data independent of the print job, and performs the control of various processes in accordance with the job control data and the job control data independent of the print job. The job control data independent of the print job includes, for example, control data sent to the printer when job management numbers or passwords, which will be described later, are sent to the printer.

FIG. 3 illustrates a restriction structure table.

FIGS. 4A-4C are restriction level tables.

The memory 13 stores the restriction structure table shown in FIG. 3. The restriction structure table lists predetermined items necessary for placing print restriction on various print jobs: print job information, the associated maximum number of restriction level tables that may be registered, and an associated level of print restriction. The print restriction is defined in three levels: LEVEL #1 for non-restriction, LEVEL #2 for monochrome printing, and LEVEL #3 for printing not allowed. Based on the restriction structure table shown in FIG. 3, the printer 3 generates restriction level tables as shown in FIGS. 4A-4C.

FIGS. 4A-4C illustrate restriction level tables.

Referring to FIG. 4A, USER #1 is assigned print restriction LEVEL #1 (not restricted) that permits printing of the job in accordance with the print restriction LEVEL #1. USER #2 is assigned print restriction LEVEL #2 (monochrome printing) that permit printing of the job in accordance with the print restriction LEVEL #2 regardless of whether the print job is a color image. USER #3 is assigned print restriction LEVEL #3, not permitting printing of the job. The print restriction LEVEL #3 is also assigned if the user name has not registered. Referring to FIG. 4B, the restriction level table stores print restriction levels assigned to various application names. For example, APPLICATION #1 is assigned print LEVEL #1 (i.e., not restricted). Referring to FIG. 4C, the restriction level table stores print restriction levels assigned to various URLs.

FIGS. 5A and 5B illustrate examples of print jobs. When a print job is printed, the control data parser 11 first parses the contents of the restriction level tables for the print job, thereby printing the print job at the highest one of the print restriction levels shown in FIGS. 4A-4C (user name, Application name, and URL). Specifically, when the printer 3 receives a print job A shown in FIG. 5A, the control data parser 11 refers to the restriction level tables stored in the memory 13, thereby reading the print restriction levels of the respective print job information. The control data parser 11 refers to the job control data of print job A, and reads print job information, i.e., the user name "USER #1" and the application name "APPLICATION #1." Then, the control data parser 11 refers to the restriction level table in the memory 13, thereby reading the print restriction level for these two items of print job information.

In other words, because the user name is "USER #1" and the application name is "APPLICATION #1," the control data parser 11 determines the highest one of the three print restriction levels, i.e., print restriction LEVEL #1. Then, a print engine 19 performs printing of the print job A in accordance with the print restriction LEVEL #1.

When the printer 3 receives a print job B shown in FIG. 5B, the control data parser 11 refers to the user name "USER #2" and application name "APPLICATION #3", thereby reading the print restriction LEVEL #2 and print restriction LEVEL #3 from the memory 13. Subsequently, the control data parser 11 determines that the highest one of the three print restriction levels is indeed the print restriction level for the print job B, i.e., print restriction LEVEL #3.

FIG. 6 illustrates a printing format table.

In this specification, a first printing format is a printing format that is not restricted so that a user's desired printout is outputted. A second printing format is a printing format in which a print job is printed at a print restriction level assigned. A third printing format is a printing format other than the first and second printing formats.

The printing format table lists the respective items of print job information (i.e., user name, application name, and URL) and associated third printing formats. Specifically, the third printing format has a lower print quality than any other printing formats that are allowed to print. If restriction of a certain level has been placed on a print job, the third printing format is presented to the user so that the user may be allowed to print the print job in an alternative printing format. Specifically, when the print restriction level for a print job is the print restriction LEVEL #2 and therefore only monochrome printing is allowed, the third printing format or 2-up printing, which has a lower print quality than the normal monochrome printing, is set. If a print job is assigned the print restriction LEVEL #3, which does not allow printing, thumbnail printing is selected as the third printing format. Thus, when a print job is under print restriction, the printer 3 presents the third printing format to the user and allows printing of the print job if the user accepts the alternative option. In this manner, the printer 3 places alternative level of restriction different from the original print restriction.

The print data parser 15 parses the print data contained in the print job, and then converts the print data into image data in bitmap form that can be printed with the print engine 19. Then, the print data parser 15 supplies the image data in bitmap form to the print engine 19.

FIG. 7 illustrates the operating panel 17.

Referring to FIG. 7, the operating panel 17 includes a display device 25 that displays various items of information to the user, and switches 27 with which the user inputs various commands.

Figure 8:
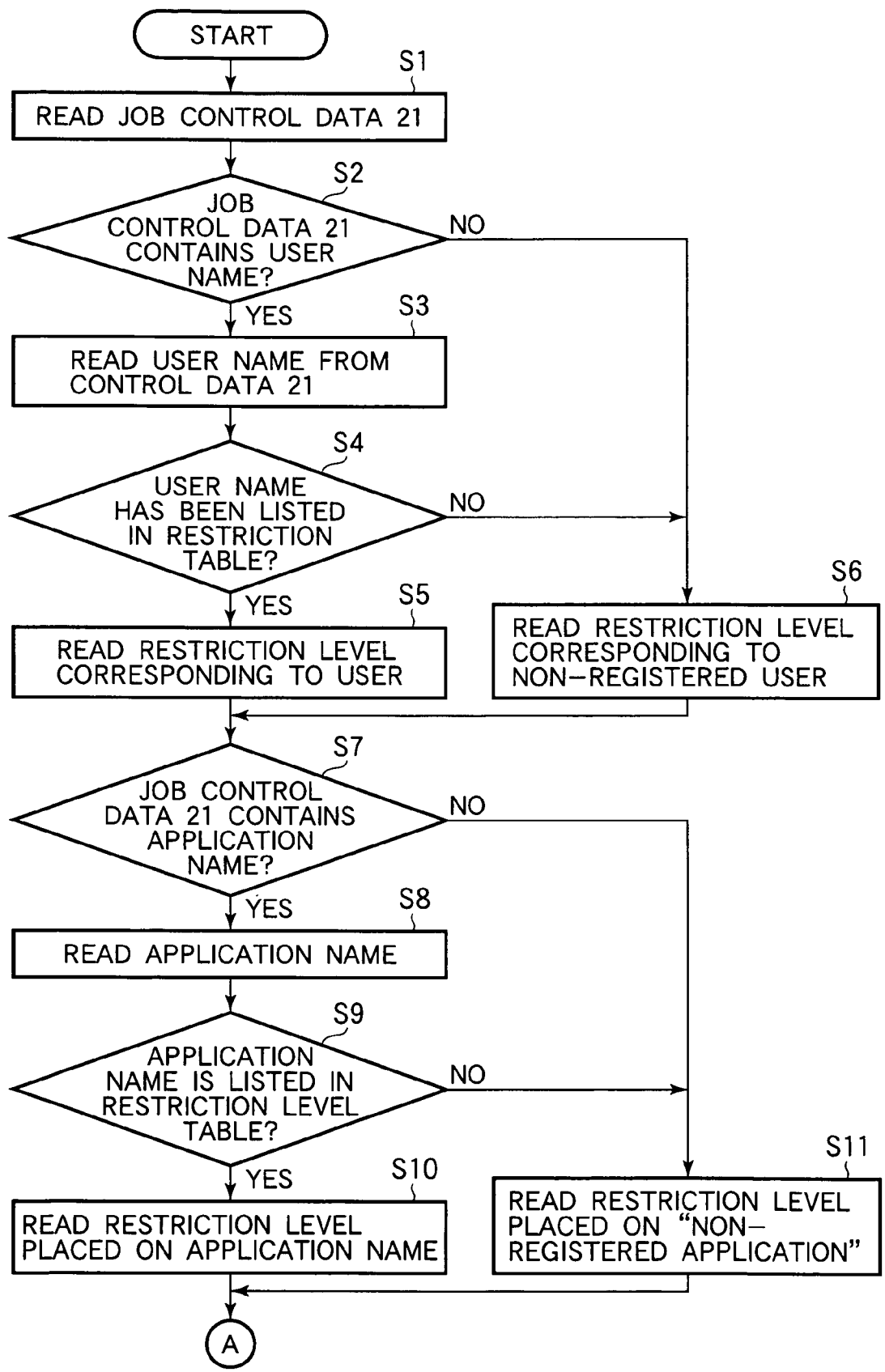
FIG. 8 is an initial portion of a flowchart illustrating the operation of the printer.
Figure 9:
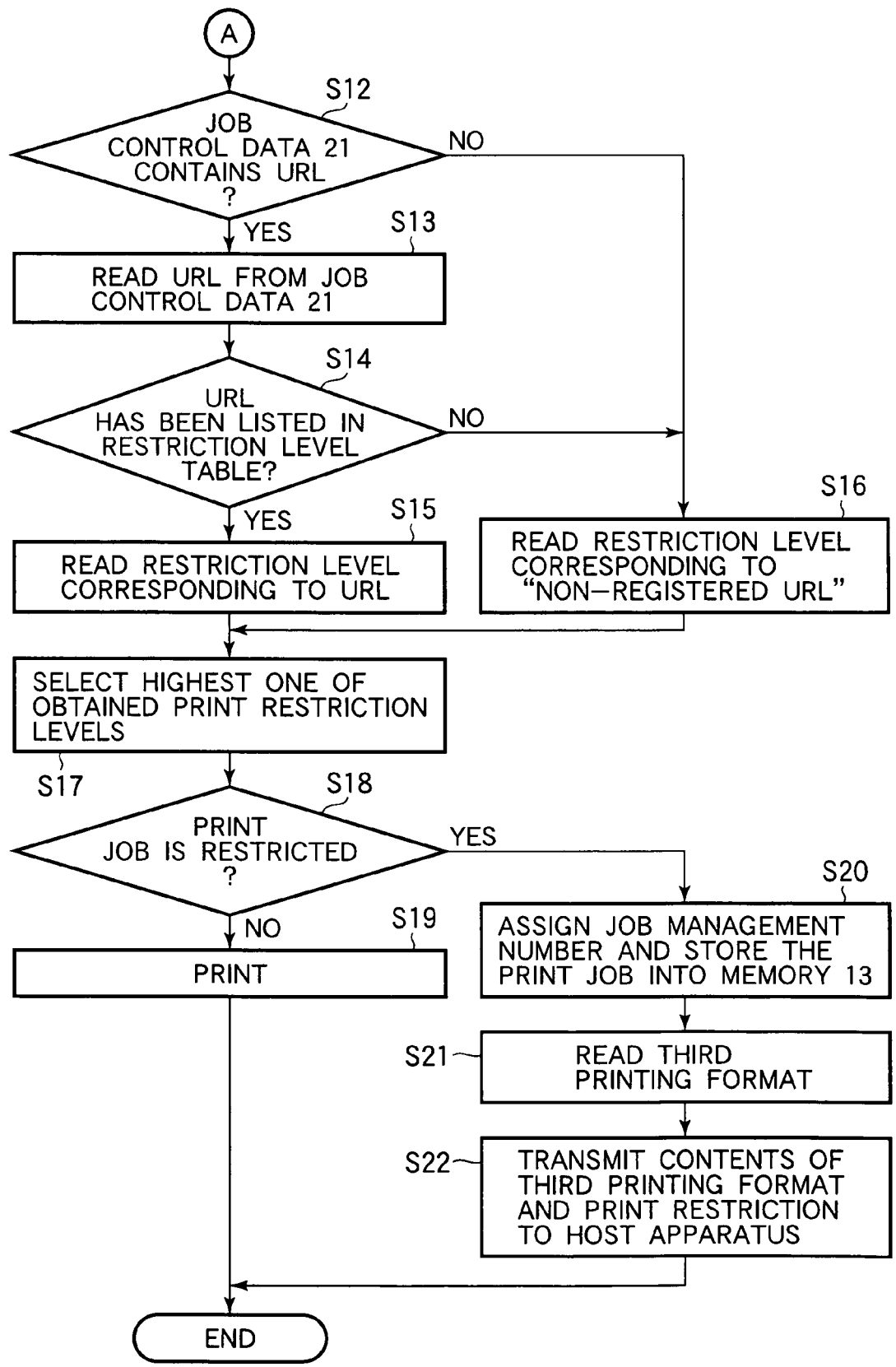
FIG. 9 is an additional portion of the flowchart shown in FIG. 8.

FIG. 8 is an initial portion of a flowchart illustrating the operation of the printer 3. FIG. 9 is an additional portion of the flowchart shown in FIG. 8. FIG. 10 illustrates a screen that appears on a display device (not shown).

The operation of the printer 3 will be described in detail with reference to FIGS. 8 and 9.

Upon a print job, the printer initiates a series of necessary processing of the print job stored in the memory 13. The printer 3 reads the job control data 21 at step S1. In other words, the control data parser 11 extracts the job control data from the print job stored in the memory 13.

Thereafter, the printer 3 executes the process for reading the items from the restriction structure table, starting from step S2.

First, the printer 3 makes a decision at step S2 to determine whether the job control data 21 contains a user name. If YES at step S2, the printer 3 reads the user name from the job control data 21 at step S3. At step S4, the printer 3 makes a decision to determine whether the user name has been listed in the restriction level table. Specifically, the control data parser 11 refers to the restriction level table using the user name to determine whether the restriction level table lists the user name. If YES at step S4, the printer 3 reads a print restriction level corresponding to the user who inputted the print job, thereby obtaining the print restriction level corresponding to the user who inputted the print job. If YES at step S4, the printer 3 reads the print restriction level corresponding to the user name from the restriction level table at step S5. In this manner, the printer obtains the print restriction level corresponding to the user who inputted the print job. If the decision at step S2 is that the user name is not contained in the job control data 21 or the decision at step S4 is that the user name is not listed in the restriction table, the printer 3 reads a print restriction level corresponding to "NON-REGISTERED USER" at step S6. In other words, the control data parser 11 reads the print restriction level corresponding to "NON-REGISTERED USER" listed in the restriction level table.

Then, the printer 3 executes the process for reading a print restriction level for an application name. Specifically, at step S7, the printer 3 makes a decision to determine whether the job control data 21 contains an application name. If YES at step S7, then the printer 3 reads the application name at step S8. Then, the printer 3 makes a decision at step S9 to determine whether the application name is listed in the print restriction level table. If YES at step S9, the printer 3 reads the print restriction level placed on the application name at S10. If NO at step S7 or NO at step S9, the printer 3 reads a print restriction level placed on "NON-REGISTERED APPLICATION" at step S11.

The printer 3 then executes the process for reading a print restriction level for a URL. Specifically, the printer 3 makes a decision at step S12 to determine whether a universal resource locator (URL) is contained in the job control data 21. If YES at step S12, the printer 3 reads the URL from the job control data 21 at step S13. Then, the printer 3 makes a decision at step S14 to determine whether the URL has been listed in the restriction level table. If YES at step S14, the printer 3 reads the print restriction level for the URL at step S15. If NO at step S12 or NO at step S14, the printer 3 reads the print restriction level corresponding to "NON-REGISTERED URL" at step S16. In this manner, the printer 3 reads the print restriction level placed on "NON-REGISTERED URL".

At step S17, the printer 3 selects the highest one of the obtained different print restriction levels. In other words, the control data parser 11 selects the highest one of the obtained different print restriction levels. At step S18, the printer 3 makes a decision to determine whether the print job is restricted to a certain level. In other words, the control data parser 11 checks the print restriction level obtained at step S17, and makes a decision to determine whether the print restriction level is LEVEL #1. If the print restriction level is LEVEL #1, the job is not restricted. If the print restriction level is LEVEL #2 or LEVEL #3, the print job is restricted to some extent.

If no restriction has been placed on the print job (NO at step S18), the printing is performed for the print job at step S19. Printing is performed either in color printing or in monochrome printing with a font specified by the job control data 21, thereby outputting the user's desired printout.

If the decision at step S18 is that restriction has been placed on the print job, the printer 3 assigns the print job a job management number, and then stores the print job together with the job management number into the memory 13 at step S20. In other words, the control data parser 11 assigns the print job the job management number, which is a string of numbers identifying the print job, and then stores the print job together with the job management number into the memory 13.

At step S21, the printer 3 reads a third printing format. In other words, the control data parser 11 reads the third printing format from the printing format table in the memory 13. At step S22, the printer 3 transmits the content of the third printing format and the content of restriction to the host apparatus 1. This completes the operation of the printer 3.

Then, the host apparatus 1 displays a screen as shown in FIG. 10 on a display device (not shown). Specifically, the screen includes a received information field 29 and a command input field 31. The received information field 29 displays print job information and types of print restriction, restriction actually placed on the job, and third printing format. The user inputs one of three options into the command input field 31: (1) print under the print restriction actually placed on the job, (2) cancel the print job, and (3) print in a third printing format. Then, the selected option is transmitted to the printer 3.

Figure 11:
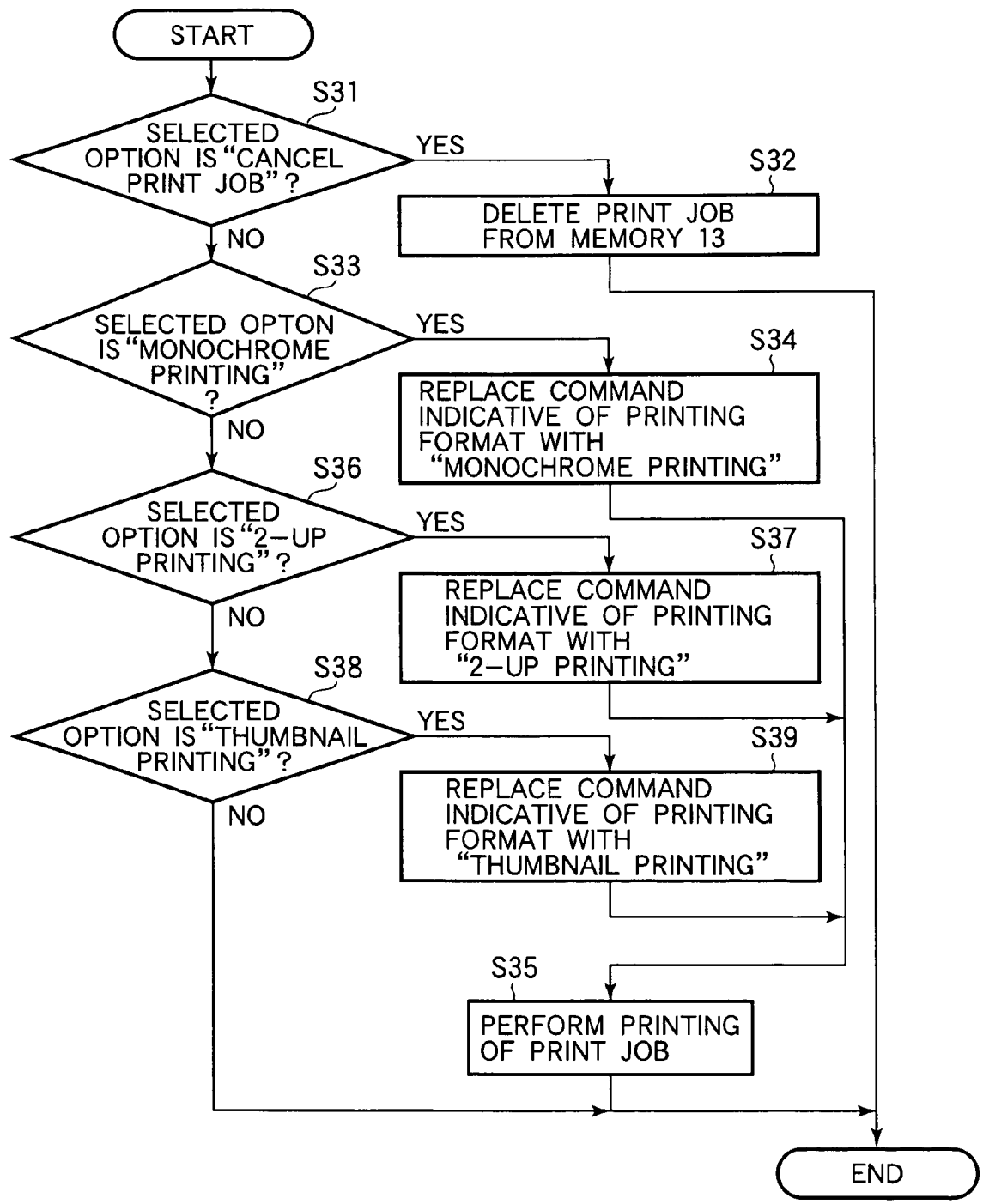
FIG. 11 is a flowchart illustrating the operation of the printer.

FIG. 11 is a flowchart illustrating the operation of the printer 3.

The operation of the printer 3 after receiving the selected option from the host apparatus 1 will be described with reference to FIG. 11.

Upon receiving the selected option from the host apparatus 1, the printer 3 makes a decision at step S31 to determine whether the selected option is "cancel the print job". In practice, the control data parser 11 parses the option received from the host apparatus 1. If YES at step S31, the printer 3 deletes the print job from the memory 13 at step S32. In other words, the control data parser 11 deletes the print job having a corresponding job management number from the memory 13.

If decision at S31 is that the selected option is not "cancel the print job", then the printer 3 makes a decision at step S33 to determine whether the selected option is to print the print job in monochrome printing. This option of monochrome printing is issued by the host apparatus 1 if the print restriction level is LEVEL #2 and the user wishes to print under the print restriction placed on the job. If YES at step S33, the printer 3 replaces at step S34 the command indicative of printing format, contained in the job control data 21 of the print job, with "monochrome printing." In other words, the control data parser 11 checks the job control data 21 of the print job stored in the memory 13. Then, the control data parser 11 replaces the printing format with "monochrome printing." At step S35, the printer 3 performs printing according to the job control data 21.

If NO at step S33, the printer 3 makes a decision at step S36 to determine whether the selected option is to print the print job in 2-up printing. If YES at step S36, the printer 3 replaces at step S37 the command indicative of printing format of the job control data of the print job with "2-up printing." Then, the printer 3 prints the print job in 2-up printing at step S35.

If NO at step S36, the printer 3 makes a decision at step S38 to determine whether the selected option is to print the print job in thumbnail printing. If YES at step S38, the printer 3 replaces at step S39 the command indicative of the printing format of the print job control data 21 of the print job with thumbnail printing. Then, the printer 3 prints the print job in thumbnail printing at step S35.

As described above, if different print restriction levels are placed on a plurality of items of print job information (e.g., user, application name, and URL), the highest one of the print restriction levels is placed on the print job before printing the print job. In other words, restriction is not determined merely based on a particular one of the plurality of items of print job information but is determined in a more practically effective manner. The image forming system of the first embodiment informs a user of the content of print restriction if a print job is not allowed to be printed in accordance with the user's preference. In this manner, the system provides the user with alternative options including, for example, cancellation of the print job, thereby improving convenience to the user.

Second Embodiment

Elements similar to those of the first embodiment have been given the same reference numerals and their description is omitted.

A description will be given only of a portion different from the first embodiment.

Figure 12:
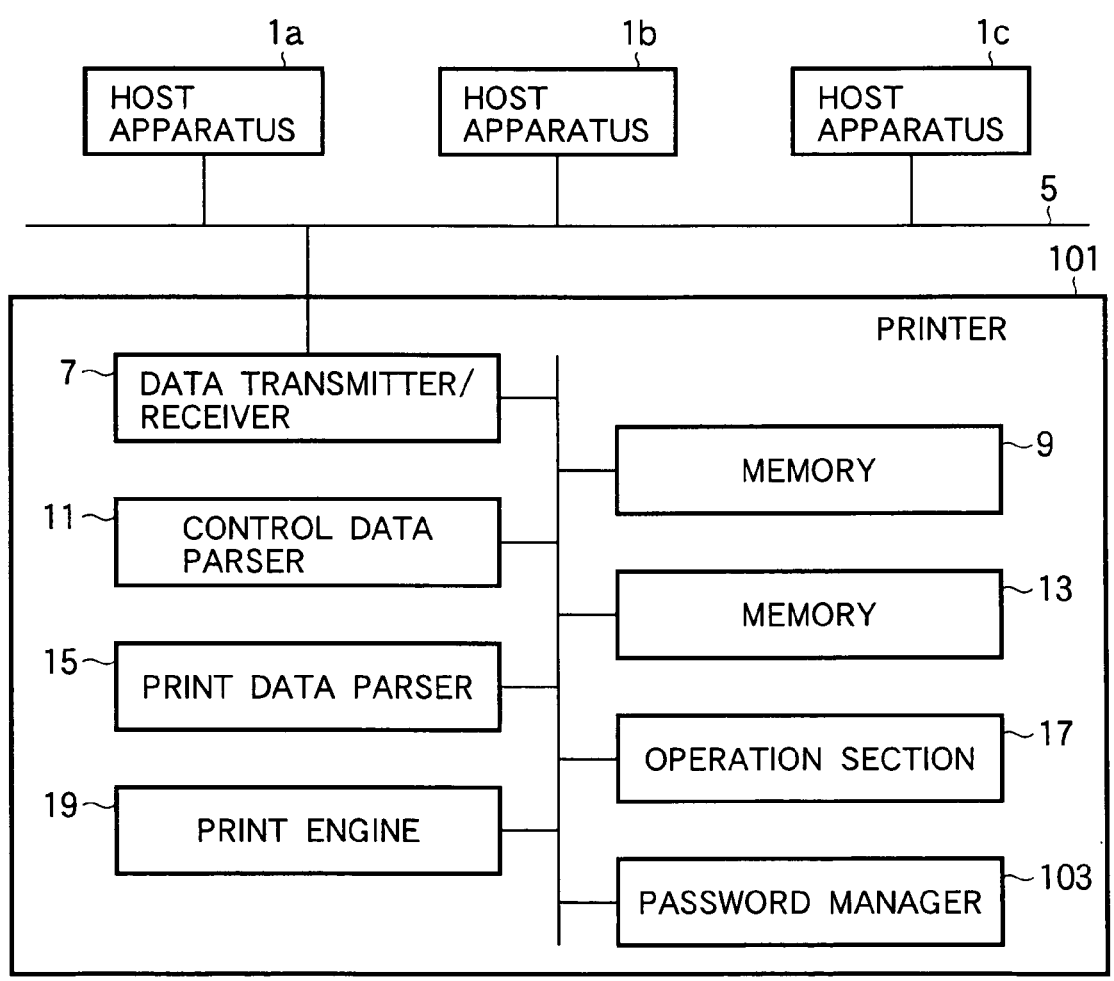
FIG. 12 illustrates an image forming apparatus and an information processing apparatus of a second embodiment.

FIG. 12 illustrates an image forming apparatus and an information processing apparatus of a second embodiment. Referring to FIG. 12, a printer 101 is configured as a printer having a password manager 103 that manages passwords.

The password manager 103 manages the passwords used by the users for lifting print restriction. An administrator of the printer 3 inputs the passwords into the password manager 103 from the operating panel 17 or from the host apparatus 1. The passwords stored in the password manager 103 are read, and are compared with a password inputted by a user. If the password inputted by the user coincides with one of the passwords stored in the password manager 103, the printer 3 lifts the print restriction before printing the print job.

Figure 13:
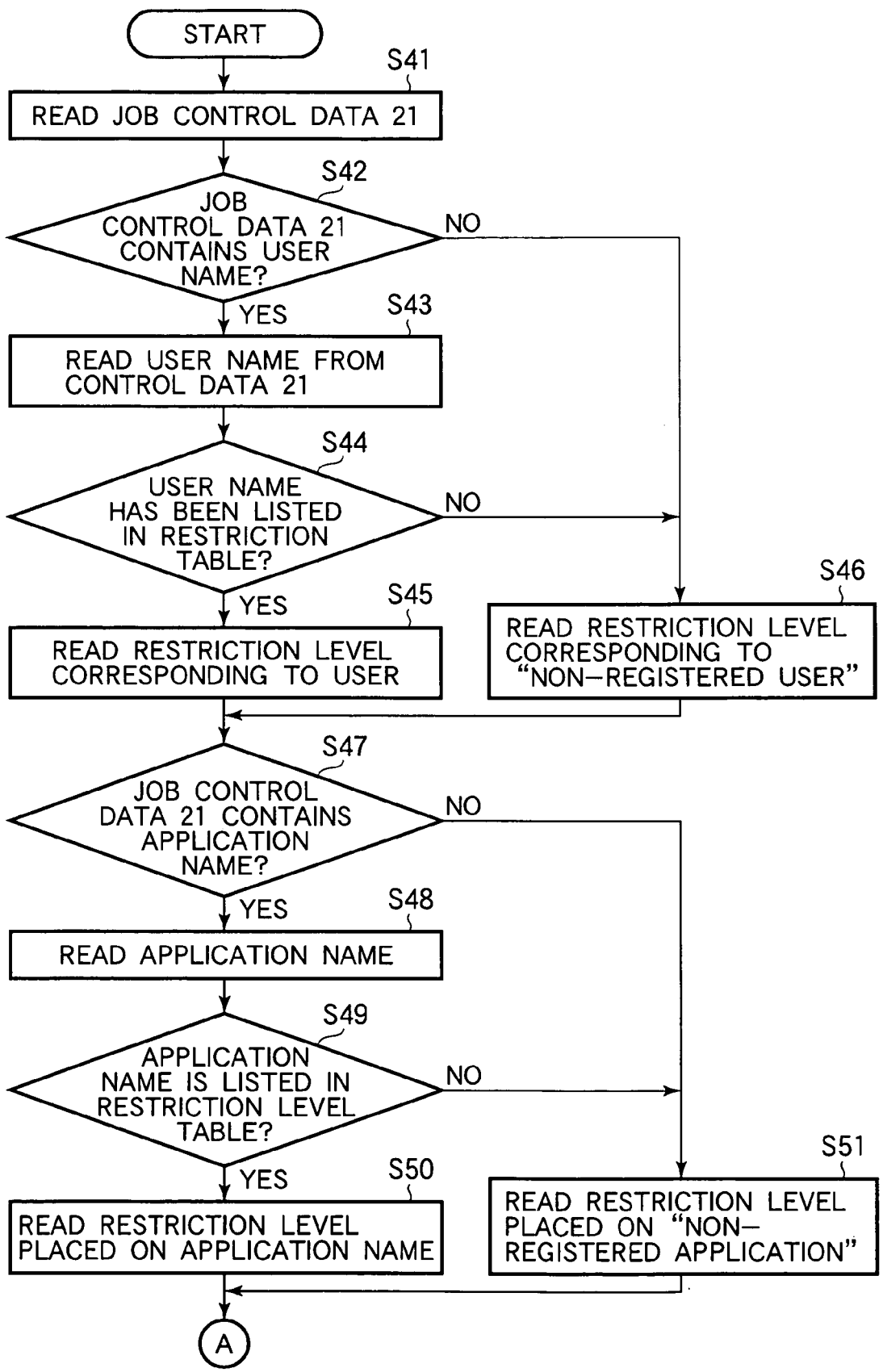
FIG. 13 is an initial portion of a flowchart illustrating the operation of the printer.
Figure 14:
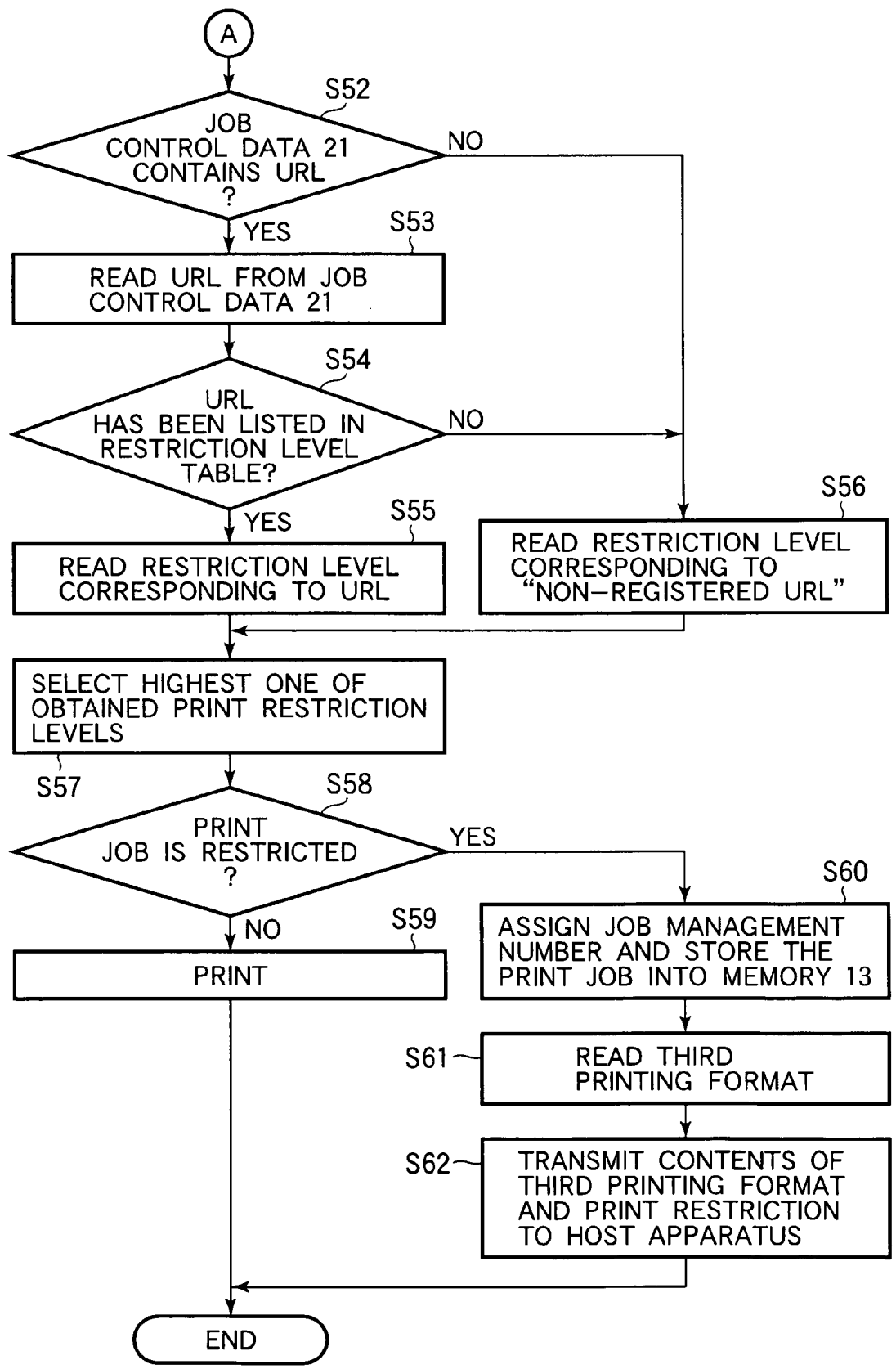
FIG. 14 is an additional portion of the flowchart shown in FIG. 13.

FIG. 13 is an initial portion of a flowchart illustrating the operation of the printer 101;

FIG. 14 is an additional portion of the flowchart shown in FIG. 13.

Figure 15:
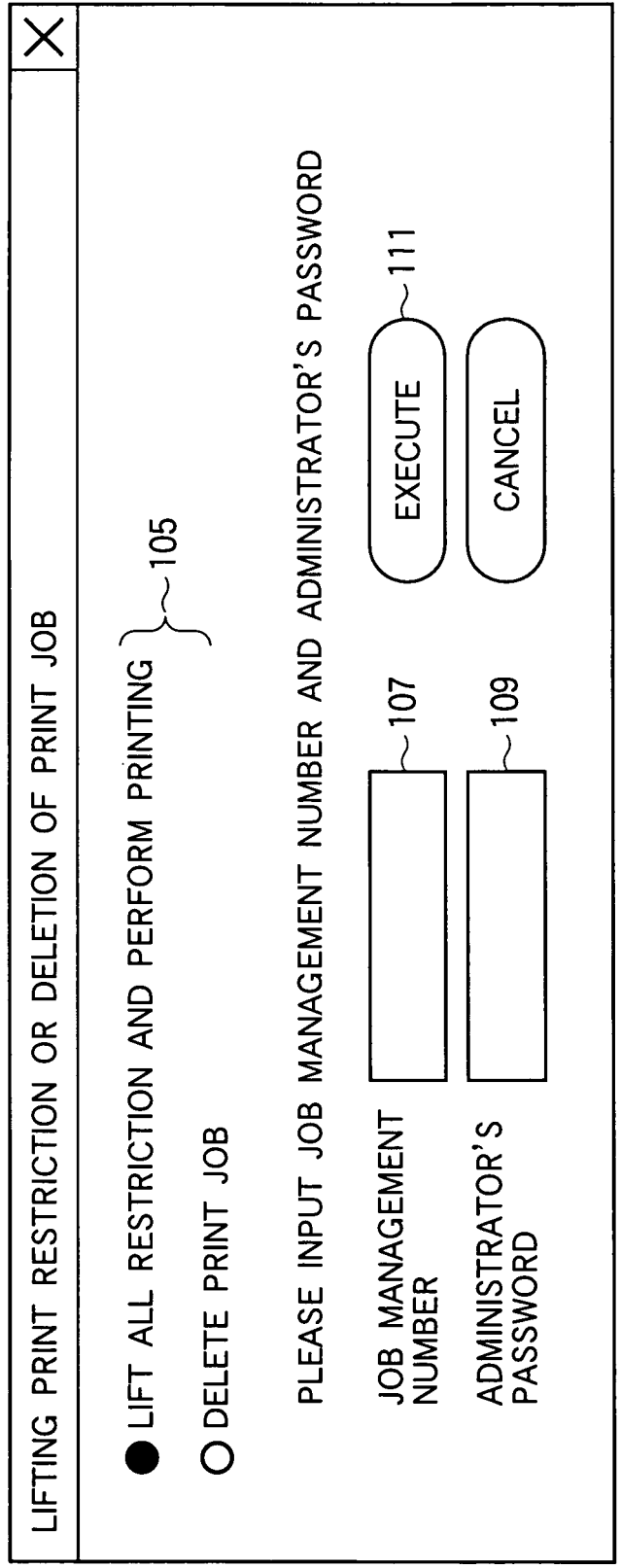
FIG. 15 illustrates a screen that appears on a display device (not shown)

FIG. 15 illustrates a screen that appears on a display device (not shown).

The operation of the printer 101 will be described in detail with reference to FIGS. 13 and 14.

The printer 3 receives a print job (print data and job control data 21) from the host apparatus 1, and the print job is stored into the memory 13. Then, the printing operation starts. At step S41, the printer 101 reads job control data 21.

Then, the printer 101 performs the process for reading print settings at step S42 onward. At step S42, the printer 101 makes a decision to determine whether the job control data 21 contains a user name. If YES at step S42, the printer 101 reads the user name from the job control data 21 at step S43. Then, the printer 101 makes a decision at step S44 to determine whether the user name read from the job control data 21 is found in a restriction level table. If YES at step S44, the printer 101 reads a print restriction level associated with the user name from the restriction level table. In this manner, the printer 101 obtains the print restriction level placed on the user who requested to print the print job. If NO at step S42 or step S44, the printer 101 reads the print restriction level associated with "NON-REGISTERED USER" at step S46.

The printer 101 performs the process for reading the print restriction level placed on "APPLICATION NAME." Specifically, the printer 101 makes a decision at step S47 to determine whether the job control data 21 contains an application name. If YES at step S47, the printer 101 reads the application name from the job control data 21 at step S48. Then, the printer 101 makes a decision at step S49 to determine whether the restriction level table lists the application name. If YES at step S49, the printer 101 reads the print restriction level corresponding to the application name at S50. If NO at step S47 or step S49, the printer 101 reads the print restriction level associated with "NON-REGISTERED APPLICATION."

The printer 101 performs the process for reading the print restriction level placed on "URL." Specifically, the printer 101 makes a decision at step S52 to determine whether the job control data 21 contains a URL. If YES at step S52, the printer 101 reads the URL from the job control data 21 at step S53. Then, the printer 101 makes a decision at step S54 to determine whether the control level table lists the URL. If YES at step S54, the printer 101 reads the print restriction level corresponding to the URL. If NO at step S52 or step S54, the printer 101 reads the print restriction level corresponding to "NON-REGISTERED URL" at step S56. As described above, the printer 101 reads the print restriction level corresponding to "USER NAME," "APPLICATION NAME," or "URL."

At step S57, the printer 101 selects the highest one of a plurality of the obtained print restriction levels. Then, the printer 101 makes a decision at step S58 to determine whether print restriction has been placed on the print job. If NO at step S58, the printer 101 performs printing of the received print job at step S59. The printing is performed in accordance with a printing format specified by the job control data 21. In this manner, the printer 101 provides the user's desired printout.

If the decision at step S58 is that print restriction has been placed on the print job, the printer 101 adds a job management number to the print job, and then stores the print job together with the job management number into the memory 13 at step S60.

At step S61, the printer 101 reads a third printing format from the printing format table in FIG. 6. At step S62, the printer 101 transmits the content of the read third printing format and the content of the restriction to the host apparatus 1 which sent the print job to the printer 101. This completes the operation of the printer 101.

The display device of the host apparatus 1 displays a screen as shown in FIG. 10. The user operates the host apparatus 1 to input a predetermined command into a command input field 31. Then, the command is sent to the printer 101. If the user does not input a predetermined command into the command input field 31 and, for example, closes the window or the screen, then the host apparatus 1 stores the job management number on the display device into a predetermined file, the job management number identifying a print job in queue.

When the administrator processes the information on the print job in queue, a screen as shown in FIG. 15 is displayed on the display device of the host apparatus 1. Specifically, the display device displays a restriction-handling field 105, a job management number input field 107, and a password input field 109. The restriction-handling field 105 provides options for the user to select either lifting all the print restrictions placed on the print job or canceling the print job. The user inputs a job number through the job management number input field 107. The user inputs a password through the password input field 109. The user selects one of the options at the restriction-handling field 105, then inputs a job management number to which the selected restriction-handling should be applied, the job management number being inputted into the restriction-handling field 107. Finally, the user inputs a password into the password input field 109. Then, the user clicks on an execution button 11 to transmit the job management number and the password to the printer 101.

Figure 16:
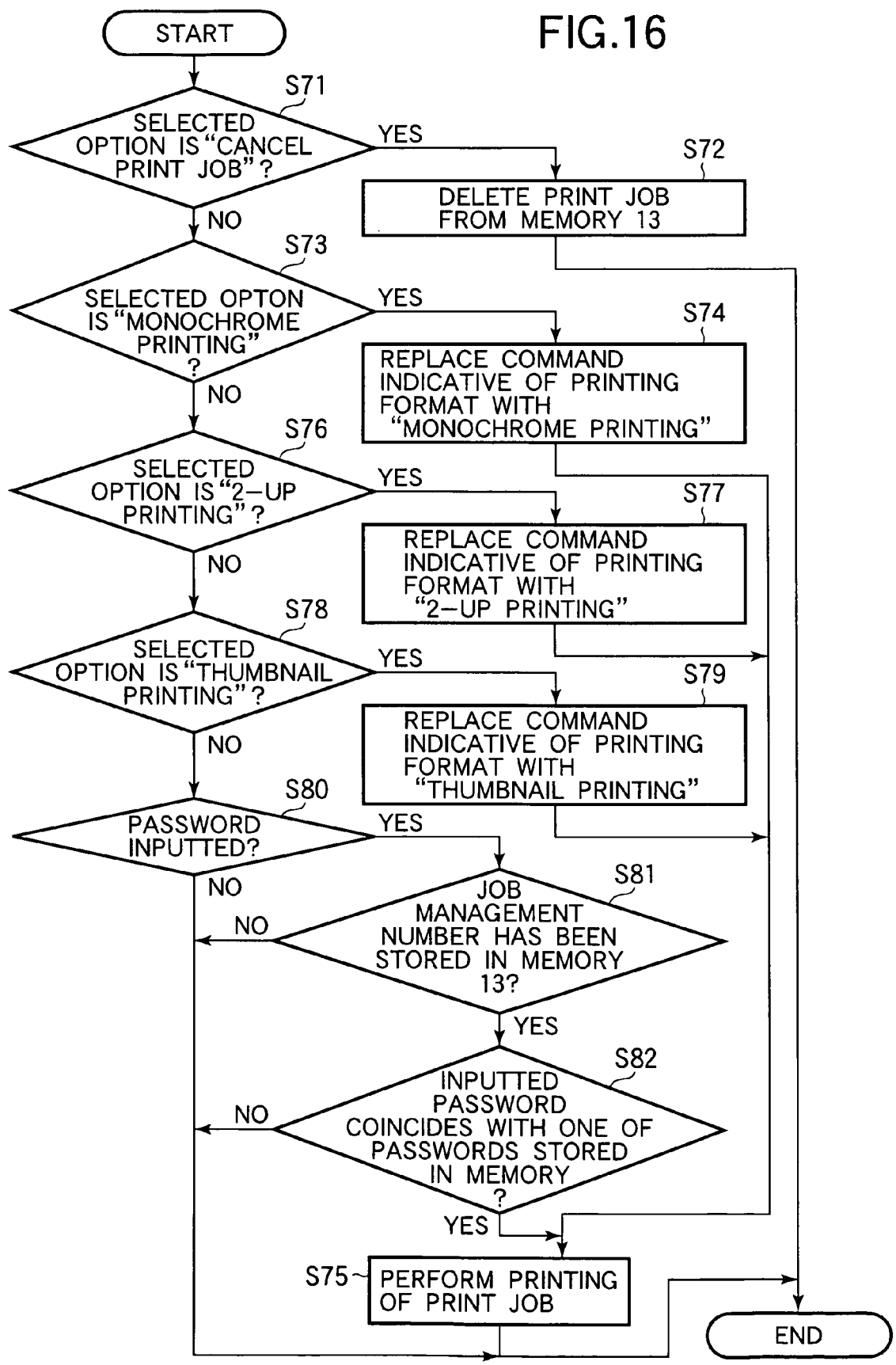
FIG. 16 is a flowchart illustrating the operation of the printer.

FIG. 16 is a flowchart illustrating the operation of the printer 101.

A description will be given of the operation of the printer 101 after having received a command associated with the print job from the host apparatus 1. The operation will be described in detail with reference to FIG. 16.

The printer 101 receives a command associated with a print job from the host apparatus 1, and starts the print operation. At step S71, the printer 101 makes a decision to determine whether the printer 101 has received a command to cancel the print. If YES at step S71, the printer 101 deletes the print job corresponding to the command from the memory 13 at step S72.

If NO at step S71, the printer 101 makes a decision at step S73 to determine whether the command specifies that the print job should be printed in monochrome printing. If YES at step S73, the printer 101 replaces at step S74 the command indicative of printing format of the job control data 21 with "MONOCHROME PRINTING." The printer 101 prints the print job according to the job control data 21 at step S75.

If NO at step S73, the printer 101 makes a decision at step S76 to determine whether the printer 101 has received a command to perform 2-up printing. If YES at step S76, the printer 101 replaces the command indicative of printing format in the job control data 21 of the print job with "2-UP PRINTING." Thereafter, at step S75, the printer 101 performs printing according to the job control data 21.

If NO at step S76, then the printer 101 makes a decision at step S78 to determine whether a command to perform thumbnail printing has been received. If YES at step S78, the printer 101 replaces the command indicative of the printing format contained in the job control data 21 of the print job with "THUMBNAIL PRINTING." Therefore, at step S75, the printer 101 performs printing according to the job control data 21.

If NO at step S78, the printer 101 makes a decision at S80 to determine whether a password has been received. If YES at step S80, the printer 101 makes a decision at step S81 to determine whether the job management number for the print job has been stored in the memory 13. If YES at step S81, the printer 101 makes a decision at step S82 to determine whether the password coincides with one of the passwords stored in the memory 13. If YES at step S82, the printer 101 prints the print job without replacing the command in the job control data 21.

If NO at steps S80, S81, or S82, the operation of the printer 101 ends.

As described above, even if printing of a print job in accordance with the user's preference is not allowed, the print restriction may be lifted depending on the print job upon approval of the administrator. Thus, the second embodiment provides more convenience to the user than the first embodiment.

Third Embodiment

A third embodiment is directed to a public computer system at, for example, school in which only a limited number of authorized users are allowed to print. A conventional computer system is configured to place restriction on file names or types of files. If a print job has a file name on which restriction has been placed, the printer 101 refuses to print the print job. Such a conventional computer system will place restriction not only on students but also teaching staffs who use the computer system, impairing convenience to the users. The third embodiment provides an image forming system in which a check is made based on a predetermined mathematical calculation to determine whether print restriction has been placed on a print job received from a host apparatus, and then restriction is alleviated for users who meet predetermined requirements.

Figure 17:
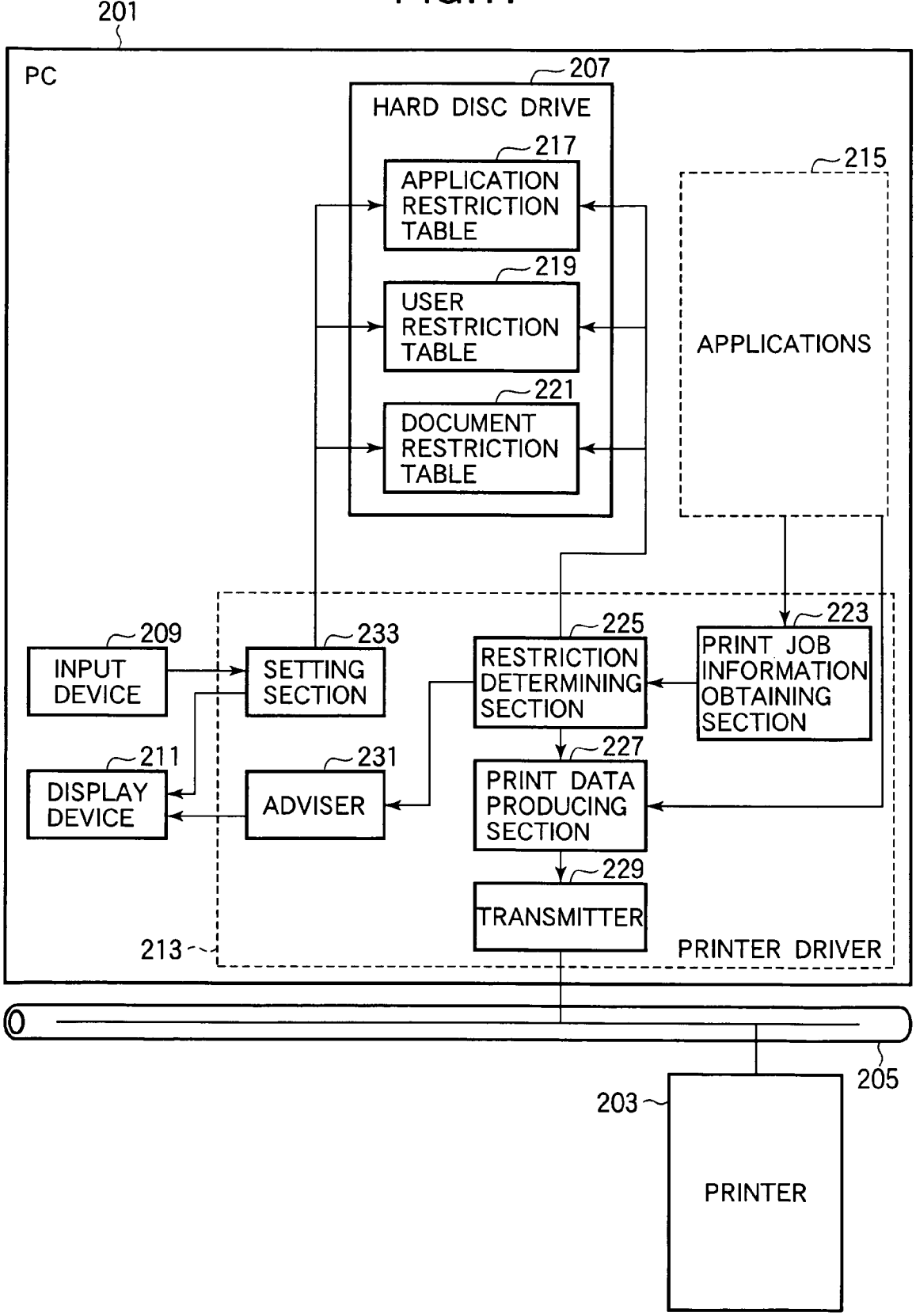
FIG. 17 illustrates an image forming apparatus and an information processing apparatus of a third embodiment.

FIG. 17 illustrates an image forming apparatus and an information processing apparatus of the third embodiment.

Referring to FIG. 17, the image forming system of the third embodiment includes an information-processing apparatus or a personal computer (PC) 201 and a printer 203 capable of performing both color printing and monochrome printing. The PC 201 and printer 203 are connected to each other via a network 205.

The PC 201 includes a hard disc 207 that stores a variety of items of information, an input device 209 through which a user or an administrator inputs various items of information into the PC 201, and a display device (monitor of the PC 201) 211 on which various items of information are displayed to the user or administrator. The PC 201 incorporates a printer driver 213 and an application 215 which are executed using a central processing unit (CPU) and a random access memory (RAM).

FIGS. 18-20 illustrate restriction tables.

The hard disc 207 stores an application restriction table 217 as shown in FIG. 18, a user restriction table 219 as shown in FIG. 19, and a document restriction table 221 as shown in FIG. 20. These restriction tables 217, 219, and 221 are generated by the administrator, and are written into the hard disc 207.

The restriction tables 217, 219, and 221 list a plurality of items of print job information such as application name, user name, and document name contained in a print job, and a printing permission flag and a printing priority flag that correspond to each one of the plurality of items of print job information. The printing permission flag indicates the content of print restriction usually placed on a print job having print job information. A printing permission flag associated with an item of print job information may have a higher print restriction level than the printing permission flags associated with remaining items of print job information. In that case, the restriction for the print job is alleviated. Thus, the printing priority flag is used to alleviate a print restriction level that should be placed on the print job if an item of print job information has a higher print restriction level than any one of remaining items of print job information.

Throughout FIGS. 18, 19, and 20, a value "0" represents non-permission of printing, a value "1" represents permission of monochrome printing only, and a value "3" represents permission of both color printing and monochrome printing. In other words, the value "3" implies that no restriction is placed.

The application restriction table is created in the following manner.

An application is used by a large number of users. Each user creates many documents by using the application. Thus, the priority of restriction scheme is based on application, user, and document, the level of priority being given in order of application name, user name, and document name. If the print priority flag for an application is set to the lowest level (here "0"), all of the users are prevented from printing documents created by the application regardless of the value given to the print permission flag. This is not practical. In order for the restriction to be more practical, when the administrator creates an application restriction table, he imposes the highest priority (here "3") to all application names, and assigns different values to the print permission flags for the application names depending on how frequently the applications are used. For example, Microsoft Word is commonly used, and therefore it is very likely that color printing is frequently performed if documents are created by Microsoft Word. Thus, the highest value is given to the print permission flag of Microsoft Word. In contrast, it is not very often that web sites are printed by using Internet Explorer. Thus, the lowest value is given to the print permission flag of Internet Explorer. Values between the highest and lowest values are given to applications which are used less frequently than a most frequently used application but more frequently than a least frequently used application.

Specifically, the application restriction table 217 lists application names, the printing permission flags associated with the application names, and the printing priority flags associated with the application names.

The user restriction table is created in the following manner.

If a user is allowed to perform color printing using any of the applications listed in the application restriction table shown in FIG. 18, then the print permission flag and print priority flag for the user are set to the highest value. If a user is prevented from printing using any of the applications listed in the application restriction table, then the lowest value is given to the print permission flag and print priority flag for the user. "OTHER USERS" shown in FIG. 19 is one such case. The highest value is given to the print priority flag for a user who is allowed to print under a certain restriction, and the lowest value is given to the print permission flag for the same user. "SMITH" shown in FIG. 19 is one such case.

Specifically, the user restriction table 219 lists user names, the printing permission flags associate with the user names, and the printing priority flags associated with the user names.

The document restriction table is created in the following manner.

Based on the restriction scheme listed in the application restriction table and the user restriction table, if printing of a document is to be allowed, the highest value is given to the print permission flag and the print priority flag for the document. If the print permission flag and the print priority flag for a document are to be assigned neither the highest value nor the lowest values, then the print permission flag for the document may be set to the lowest value, and the print priority flag may be set to the highest value.

Specifically, the document restriction table 221 lists document names, the printing permission flags associated with the document names, and the printing priority flags associated with the document names. The PC 201 places print restriction on print jobs in accordance with these restriction tables 217, 219, and 221, thereby improving convenience to the users.

The printer driver 213 includes a print job information obtaining section 223, a restriction determining section 225, a print data producing section 227, and a transmitter 229. The print job information obtaining section 223 obtains print job information from a print job created by the application 215 such as document creating software and drawing software. The restriction determining section 225 determines the content of restriction based on the print job information obtained from the print job and one of the restriction tables 217, 219, and 221. The print data producing section 227 produces print data based on the determination of the restriction determining section 225 and the print job received from the application 215. The transmitter 229 transmits the print data to the printer 203.

The printer driver 213 further includes an advisor 231 and a setting section 233. The advisor 231 displays a piece of information on the display device 211 to advise the user of the determination of the restriction determining section 225. The setting section 233 creates restriction tables 217, 219, and 221 based on the information inputted by the user through the input device 209.

The print job information obtaining section 223 obtains the print job information including the application name, user name, and document name from the print job received from the application 215, and then sends the print job information to the restriction determining section 225.

The restriction determining section 225 checks the print job information received from the print job information obtaining section 223 and the restriction tables 217, 219, and 221 stored in the hard disc 207 to determine the content of the specific restriction. The restriction determining section 225 checks these items of information to determine which of non-permission of printing, monochrome printing, and color printing should be applied to the image of the print job. The determination result of the restriction determining section 225 is stored into the print data producing section 227. If the restriction determining section 225 determines that printing is not permitted, the restriction determining section 225 sends the determination result to the advisor 231.

The print data producing section 227 generates print data based on the print job created by the application 215 and the determination received from the restriction determining section 225. Specifically, Based on the determination of the restriction determining section 225, the print data producing section 227 rewrites the color specifying information added to the header of the print job. For example, if the user wishes to print the print job in color but the restriction determining section 225 determines that only monochrome printing is permitted, the print data producing section 227 rewrites the color specifying information added to the header of the print job, from color printing to monochrome printing. After the color specifying information has been rewritten, the transmitter 229 transmits the print job to the printer 203.

FIG. 21 illustrates a screen that appears on a display device (not shown).

If the restriction determining section 225 determines that printing is not permitted, the advisor 231 displays the determination result on the display device 211 to advise the user of the determination result.

When a restriction table is to be created, the display device 211 displays a screen as shown in FIG. 21. Then, the administrator inputs various items of information into the input device 209 by referring to the image displayed on the display device 211. Thus, a restriction table is created in the PC 201.

When the restriction table is created, the display device 211 displays various fields: a print job information inputting field 251, a printing permission flag setting field 253, a printing priority flag setting field 255, an application table displaying field 257, a user table displaying field 259, and a document table displaying field 261. The user inputs print job information, for example, the user name into print job information inputting field 251. The administrator sets the content of the printing permission flag in the printing permission flag setting field 253. The application restriction table 217 (FIG. 18) is displayed in the application table displaying field 257. The application restriction table 219 (FIG. 19) is displayed in the user table displaying field 259. The document restriction table 221 (FIG. 20) is displayed in the document table displaying field 261. The administrator clicks one of radio buttons 263a-263c to select desired print job information, thereby inputting, for example, the application name 263a on which restriction should be placed. Then, the administrator selects a desired printing permission flag and printing priority flag, and then clicks on an "ADD/CHANGE" button and an "TERMINATE" button, so that the information is written into the hard disc 207 via the setting section 233.

The operation of the image forming system will be described in detail.

Figure 22:
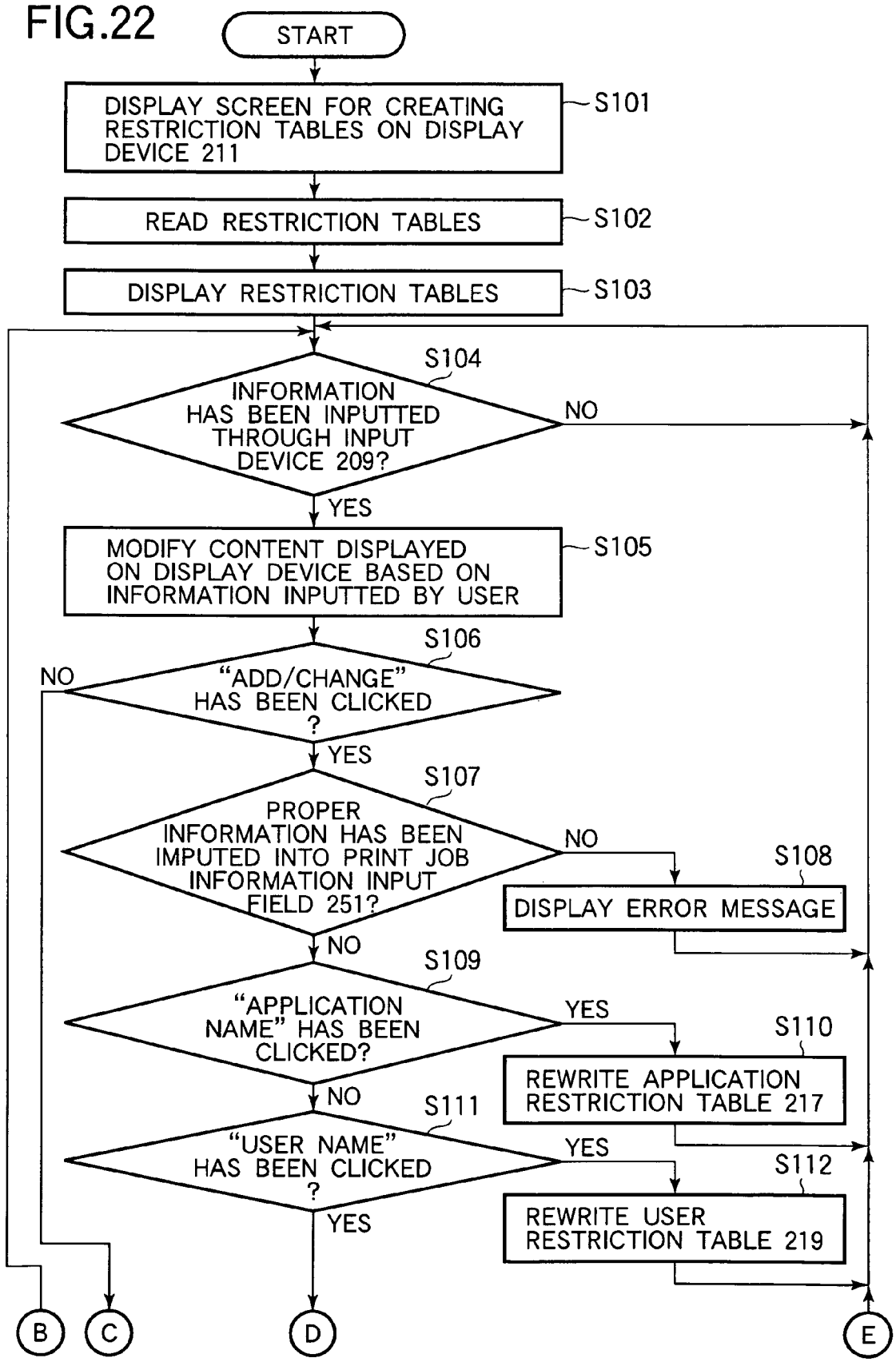
FIG. 22 is an initial portion of a flowchart illustrating the operation of the printer the third embodiment.

FIG. 22 is an initial portion of a flowchart illustrating the operation of the printer the third embodiment.

Figure 23:
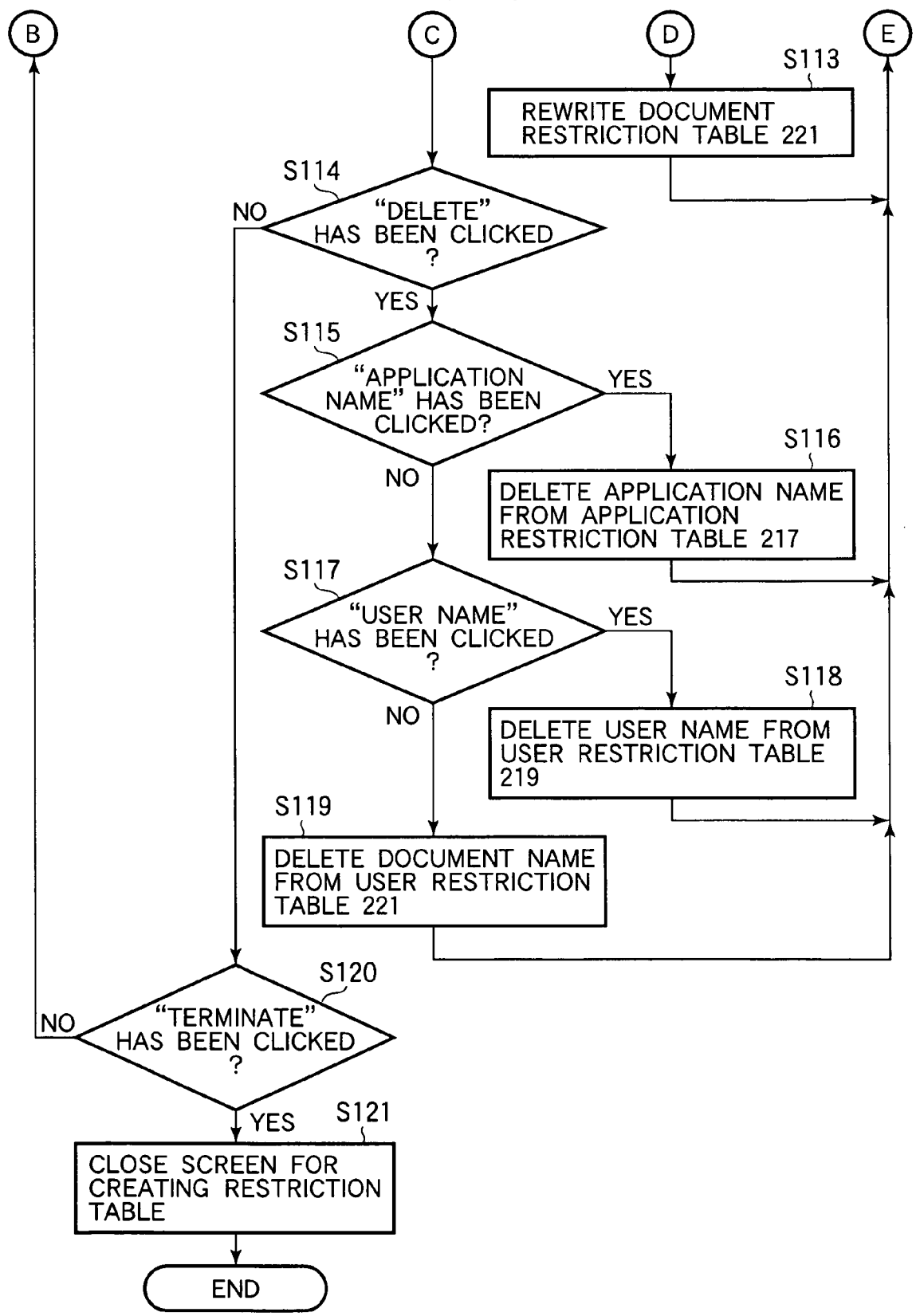
FIG. 23 is an additional portion of the flowchart shown in FIG. 22.

FIG. 23 is an additional portion of the flowchart shown in FIG. 22.

A description will be given of the operation of the PC 201 on which the restriction tables are created or rewritten. The description will be given with reference to FIGS. 22 and 23.

The administrator has inputted a command to create restriction tables through the input device 209, and then operation of the image forming system starts. At step S101, the PC 201 causes the display device 211 to display a screen for creating the restriction tables. At step S102, the PC 201 reads the restriction tables. At step S103, the PC 201 causes the display device 211 to display the restriction tables. Thus, the application restriction table 217 appears in the application table displaying field 257. The user restriction table 219 appears in the user table displaying field 259. The document restriction table 221 appears in the document table displaying field 261.

Then, the PC 201 makes a decision at step S104 to determine whether a piece of information has been inputted through the input device 209. The step S104 is iterated until some information is inputted. At step S105, the PC 201 modifies the content displayed on the display device 211, based on the information inputted by the user through the input device 209. Then, the PC 201 makes a decision at step S106 to determine whether the "ADD/CHANGE" button has been clicked. If YES at step S106, the PC 201 makes a decision at step S107 to determine whether proper information has been inputted into the print job information input field 251. If NO at step S107, the PC 201 causes the display device 211 to display an error message at step S108, and then executes the operations from step S104 onward again. If YES at step S107, then the PC 201 makes a decision at step S109 to determine whether the button 263a for application name has been clicked. If YES at step S109, the PC 201 rewrites the application restriction table 217 at step S110. In practice, the setting section 233 rewrites the application restriction table 217 stored in the hard disc 207, based on the content selected in the application name restriction setting field 253 and the printing priority flag setting field 255. If NO at step S109, the PC 201 makes a decision at step S111 to determine whether the button 263b for selecting a user name has been clicked. If YES at step S111, the PC 201 rewrites the user restriction table 219 at step S112. If NO at step S111, the PC 201 determines that the button 263c for selecting a document name has been clicked. Thus, the PC 201 rewrites the document restriction table 221 at step S113. After having rewritten the appropriate table, the PC 201 executes the operations from step S104 onward.

If NO at step S106, the PC 201 makes a decision at step S114 to determine whether a "DELETE" button has been clicked. If YES at step S114, the PC 201 makes a decision at step S115 to determine whether the button 263a for selecting the application name has been clicked. If YES at step S115, the PC 201 deletes at step S116 the application name, inputted into the print job information inputting field 251, from the application restriction table 217. This alleviates the print restriction placed on the application name. If NO at step S115, the PC 201 makes a decision at step S117 to determine whether the button 263b for selecting the user name has been clicked. If YES at step S117, the PC 201 deletes at step S118 the user name, inputted into the print job information inputting field 251, from the application restriction table 219. If NO at step S117, the PC 201 determines that the button 263c for selecting the document name has been selected. The PC 201 deletes at step S119 the document name, inputted into the print job information inputting field 251, from the document restriction table 221. Then, the PC 201 deletes the corresponding items from the respective tables, and then executes the operations from step S104 onward again.

If NO at step S114, the PC 201 makes a decision at step S120 to determine whether the "TERMINATE" button has been clicked. If NO at step S120, the PC 201 executes the operations from step S104 onward again.

If YES at step S120, the PC 201 closes the screen for creating a restriction table at step S121. This completes the operation.

Figure 24:
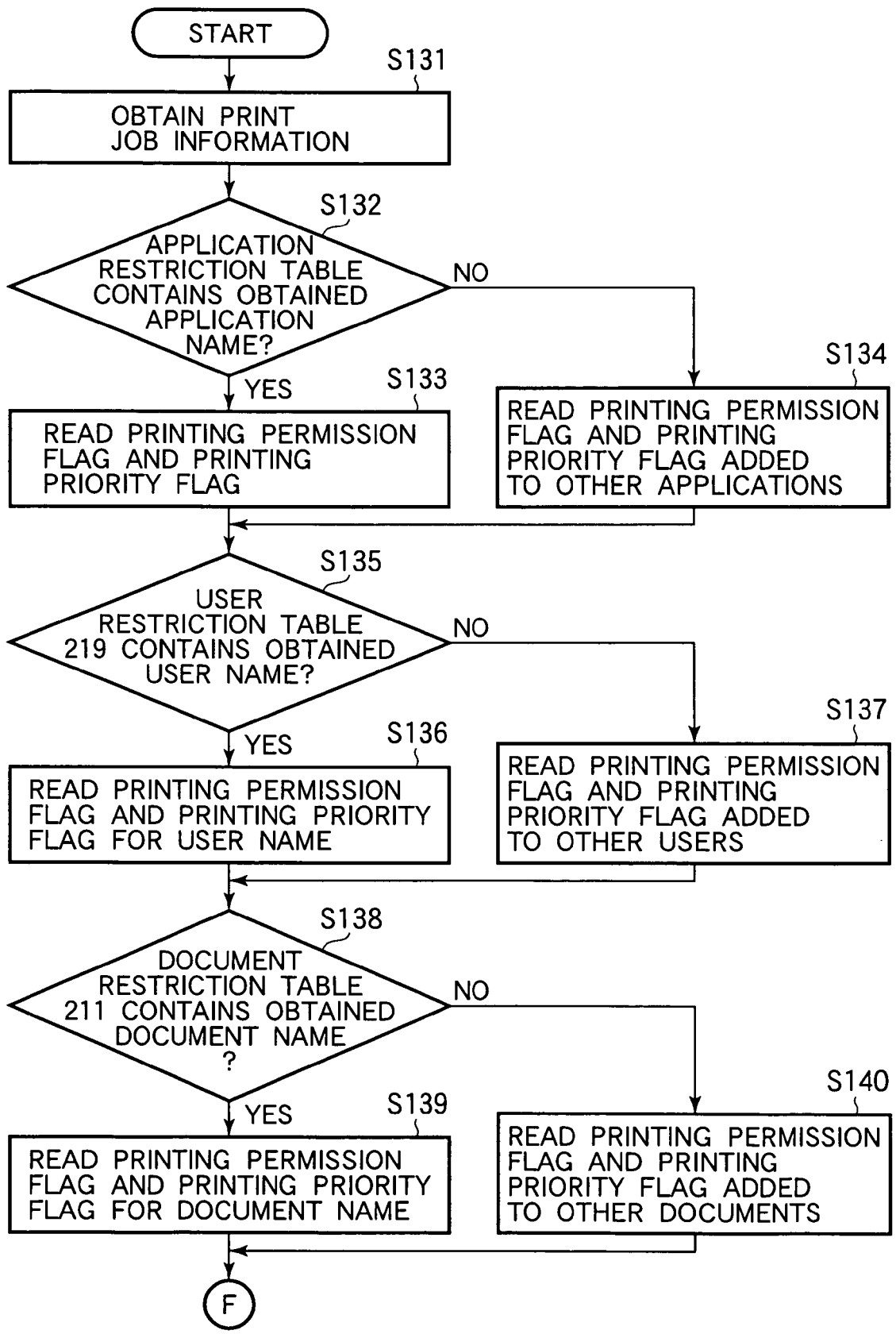
FIG. 24 is an initial portion of a flowchart illustrating the operation of the printer the third embodiment.

FIG. 24 is an initial portion of a flowchart illustrating the operation of the printer the third embodiment.

Figure 25:
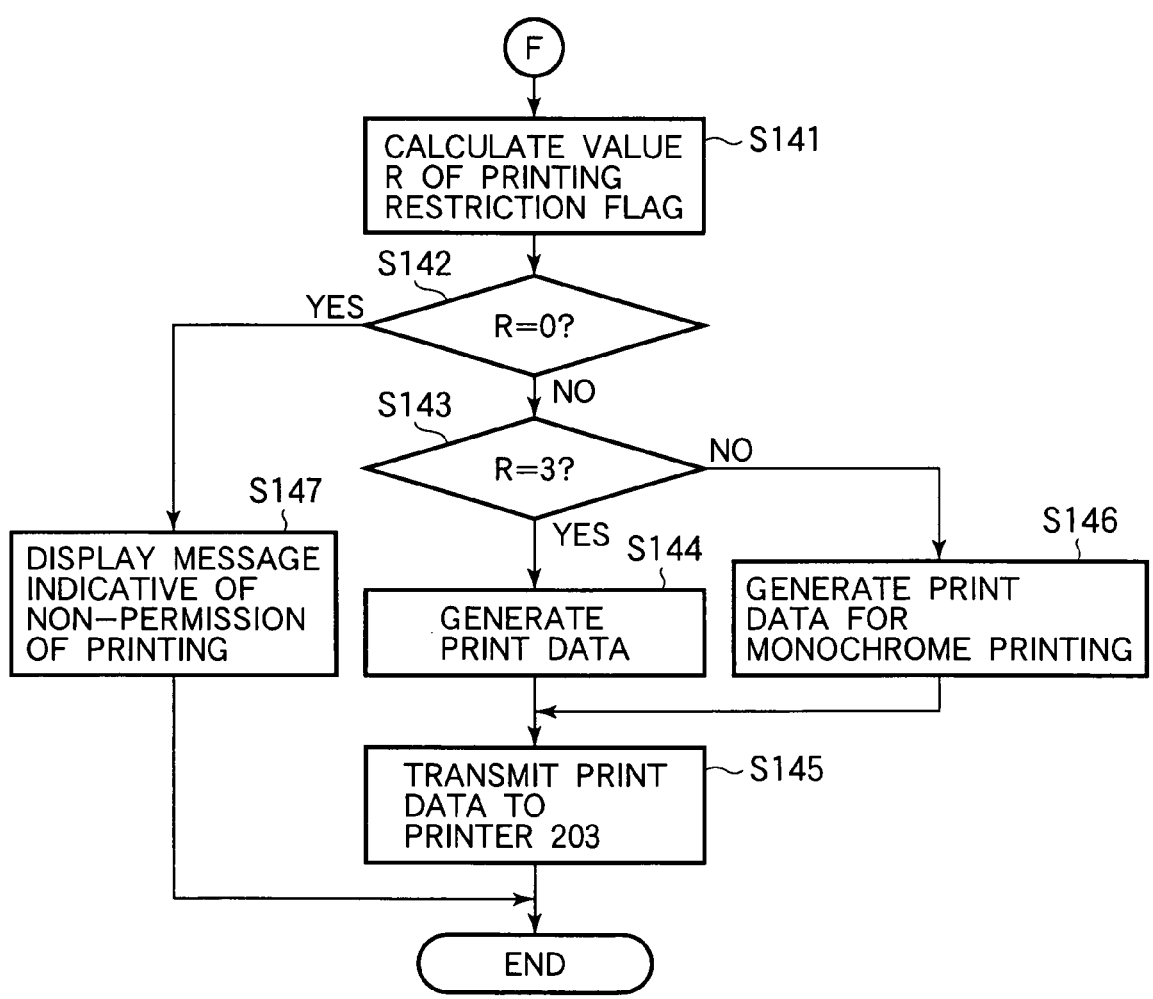
FIG. 25 is an additional portion of the flowchart shown in FIG. 24.

FIG. 25 is an additional portion of the flowchart shown in FIG. 24.

A description will be given of the operation in which the PC 201 transmits the print data to the printer 203. The description will be given in detail with reference to FIGS. 24 and 25.

At step S131, the PC 201 parses the print job to obtain the print job information. In practice, the print job information obtaining section 223 extracts the print job information from the print job received from the application 215.

The PC 201 makes a decision at step S132 to determine whether the application restriction table 217 contains the same application name as the obtained application name. In practice, the restriction determining section 225 refers to the application restriction table 217, thereby determining whether the application restriction table 217 contains the same application name as the obtained application name. If YES at step S132, the PC 201 reads at step S133 the printing permission flag and printing priority flag for the application name. If NO at step S132, the PC 201 reads at step S134 the printing permission flag and printing priority flag attached to other application names. In this manner, the PC 201 obtains a flag indicative of print restriction for the application name.

At step S135, the PC 201 makes a decision to determine whether the user restriction table 219 contains the obtained user name. In practice, the restriction determining section 225 refers to the user restriction table 219 and makes a decision to determine whether the user name stored in the user restriction table 219 is the same as the user name obtained from the print job. If YES at step S135, the PC 201 reads the printing permission flag and the printing priority flag for the user name at step S136. If NO at step S135, the PC 201 reads the printing permission flag and printing priority flag assigned to another user name. In this manner, the PC 201 obtains the flag indicative of the print restriction for the user.

At step S138, the PC 201 makes a decision to determine whether the document restriction table 221 contains a document name. In practice, the restriction determining section 225 refers to the document restriction table 221 to determine whether the document restriction table 221 contains the same document name as the document obtained from the print job. If YES at step S138, the PC 201 reads the printing permission flag and printing priority flag of the document name at step S139. If NO at step S138, the PC 201 reads at step S140 the printing permission flag and printing priority flag added to another document. In this manner, the PC 201 obtains the flag indicative of print restriction for document name.

The PC 201 calculates, at step S141, the value R of the printing restriction flag indicative of the content of the print restriction placed on the print job prior to the printing of the print job. For example, the PC 201 implements the logical OR operation to output $S_{PE}$, which is a logical sum of the values of $A_{PE}$, $U_{PE}$, and $D_{PE}$ indicated by the printing permission flags follows:

$$S_{PE}=A_{PE}+U_{PE}+D_{PE} \qquad \text{Equation (1)}$$

where $A_{PE}$ is the value of the printing permission flag stored in the application restriction table 217, $U_{PE}$ is the value of the printing permission flag stored in the user restriction table 219, and $D_{PE}$ is the value of the printing permission flag stored in the document restriction table 221.

For example, if $A_{PE}=01$, $U_{PE}=11$, and $D_{PE}=11$, then the logical sum is calculated on a bit-by-bit basis to obtain $S_{PE}=11$.

Then, the PC 201 implements the logical AND operation to output $P_{PR}$, which is a logical product of the values of $A_{PR}$, $U_{PR}$, and $D_{PR}$ indicated by the printing priority flags as follows:

$$P_{PR}=A_{PR}\times U_{PR}\times D_{PR} \qquad \text{Equation (2)}$$

where $A_{PR}$ is the value of the printing priority flag stored in the application restriction table 217, $U_{PR}$ is the value of the printing priority flag stored in the user restriction table 219, and $D_{PR}$ is the value of the printing priority flag stored in the document restriction table 221.

For example, if $A_{PR}=01$, $U_{PR}=11$, and $D_{PR}=11$, then the logical product is calculated on a bit-by-bit basis to obtain $P_{PR}=01$.

Then, the PC 201 calculates a logical product R of $S_{PE}$ and $P_{PR}$ as follows:

$$R=S_{PE}\times P_{PR} \qquad \text{Equation (3)}$$

For example, if $S_{PE}=11$, $P_{PR}=01$, then $R=01$.

In this manner, the PC 201 obtains the value R of the print restriction flag. The use of Equation (3) eliminates the need for setting specific, individual values to the print permission flag and print priority flag for each combination of applications, users and documents.

The PC 201 makes a decision at step S142 to determine whether the value R of the print restriction flag is "0," thereby determining whether printing is permitted. If NO at step S142, the PC 201 makes a decision at step S143 to determine whether the value R of the print restriction flag is "3". If YES at step S143, the PC 201 generates print data at step S144. Since the value R of the print restriction flag is "3", the PC 201 determines that no print restriction is placed on the print job, and generates print data based on the color specifying information. Then, the PC 201 transmits the print data to the printer 203 at step S145. This completes the operation of the PC 201.

If NO at step S143, the PC 201 generates print data for monochrome printing at step S146. The operation at step S146 is executed forcibly even when the user wishes to print the print job in color. Thereafter, the PC 201 transmits the generated print data to the printer 203 at step S145.

If the decision at step S142 is that the value R of the print restriction is "0", the PC 201 causes the display device 211 to display that printing is not permitted at step S147, and then completes the operation of the PC 201.

As described above, the printing permission flag and printing priority flag are stored in the restriction table corresponding to a plurality of items of print job information such as application name, user name, and document name contained in a print job. In the third embodiment, it is determined based on the printing permission flag and printing priority flag whether print restriction should be placed on the print job. Thus, the third embodiment improves convenience to the user.

Fourth Embodiment

An image forming system of a fourth embodiment includes a portion common to the third embodiment. Thus, elements similar to those in the third embodiment have been given the same reference numerals and their description is omitted. A description will be given only of a portion different from the third embodiment.

Figure 26:
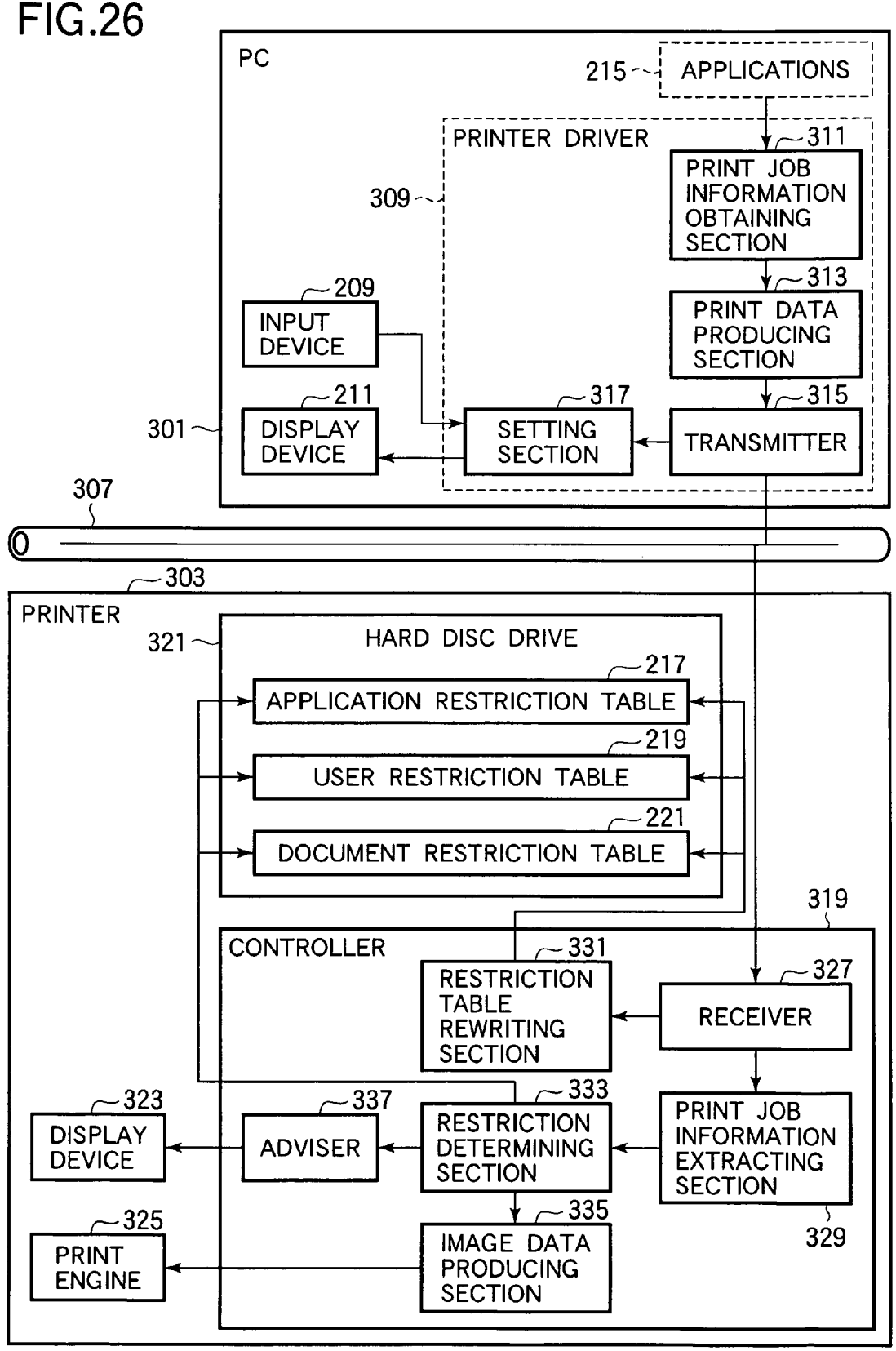
FIG. 26 illustrates the image forming system in which a personal computer is connected to a printer through a network.

FIG. 26 illustrates the image forming system in which a PC 301 is connected to a printer 303 through a network 307. The printer 303 stores restriction tables, and calculates the value R of a print restriction flag.

A printer driver 309 of the PC 301 includes a print job information obtaining section 311, a data producing section 313, a transmitter 315, and a setting section 317. The printer driver 309 obtains print job information from the application 215, and then transmits the print job to which the print job information is added.

The printer 303 includes a controller 319 that performs various control operations, a hard disc 321 that stores a restriction table therein, a display device (e.g., liquid crystal display) 323, and a print engine 325 that performs printing. The controller 319 makes a decision based on the print job and the contents of the restriction tables to determine whether printing should be performed, and the print engine 325 prints the print job.

The controller 319 includes a receiver 327, a print job information extracting section 329, a restriction table rewriting section 331, a restriction determining section 333, an image data producing section 335, and an advisor 337. The receiver 327 receives a print job from the PC 301. The print job information extracting section 329 extracts print job information from the print job. The restriction table rewriting section 331 rewrites the restriction table when a command to rewrite the restriction table is received. The restriction determining section 333 determines the content of the print restriction based on the print job information and the contents of the restriction tables. The image data producing section 335 produces the image data that should be supplied to the print engine 325. The advisor 337 causes the display device 323 to display predetermined items of information to advise the user of the determination result of the restriction determining section 333.

The receiver 327 supplies the received print job to the print job information extracting section 329. In addition, if the receiver 327 receives a command to rewrite the restriction table, the receiver 327 sends the content of the command to the restriction table rewriting section 331.

The print job information extracting section 329 extracts print job information (the application name, user name, and document name from the print job), and then supplies the extracted print job information to the restriction determining section 333.

If the PC 301 transmits a command to rewrite the restriction table to the printer 303, the restriction table rewriting section 331 rewrites the restriction table in accordance with the content of the command received from the PC 301.

Based on the print job information supplied from the print job information extracting section 329 and the restriction tables stored in the hard disc 321, the restriction determining section 333 determines the specific content of the print restriction. Specifically, the restriction determining section 333 makes a decision based on these items of information to determine which of the monochrome printing, and the color printing, and the non-printing permission should be applied to the print job. The determination result of the restriction determining section 333 is supplied to the image data producing section 335. If the restriction determining section 333 determines that printing should not be permitted, the restriction determining section 333 sends the determination result to the advisor 337.

Based on the determination result, the image data producing section 335 generates image data from the print job, and supplies the image data to the print engine 325.

The print engine 325 receives the image data from the image data producing section 335, then prints the image data, and finally provides the user with the printout. The operation of the image forming system of the aforementioned configuration will be described.

Figure 27:
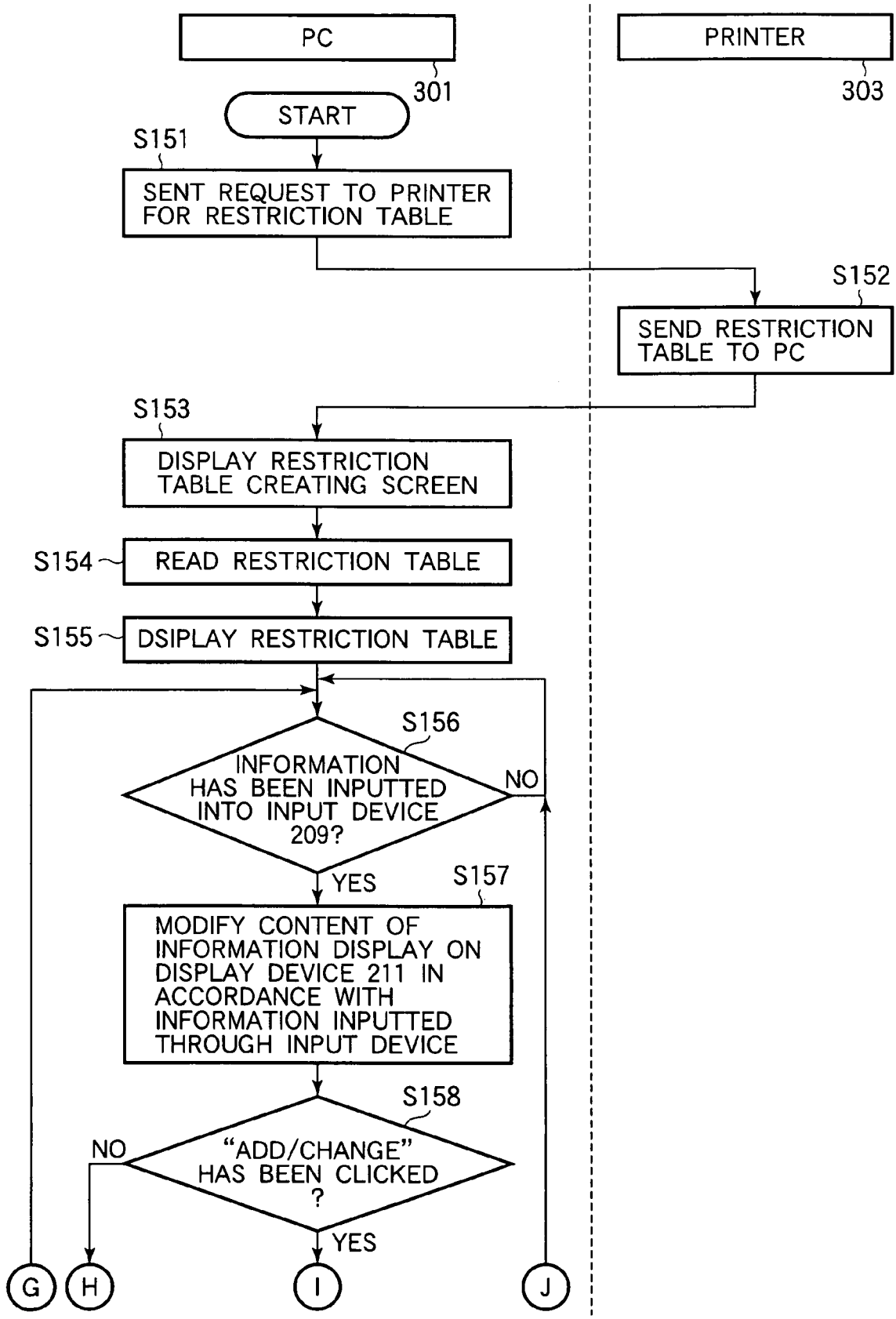
FIG. 27 is an initial portion of a flowchart illustrating the operation of the printer the fourth embodiment.

FIG. 27 is an initial portion of a flowchart illustrating the operation of the printer the fourth embodiment.

Figure 28:
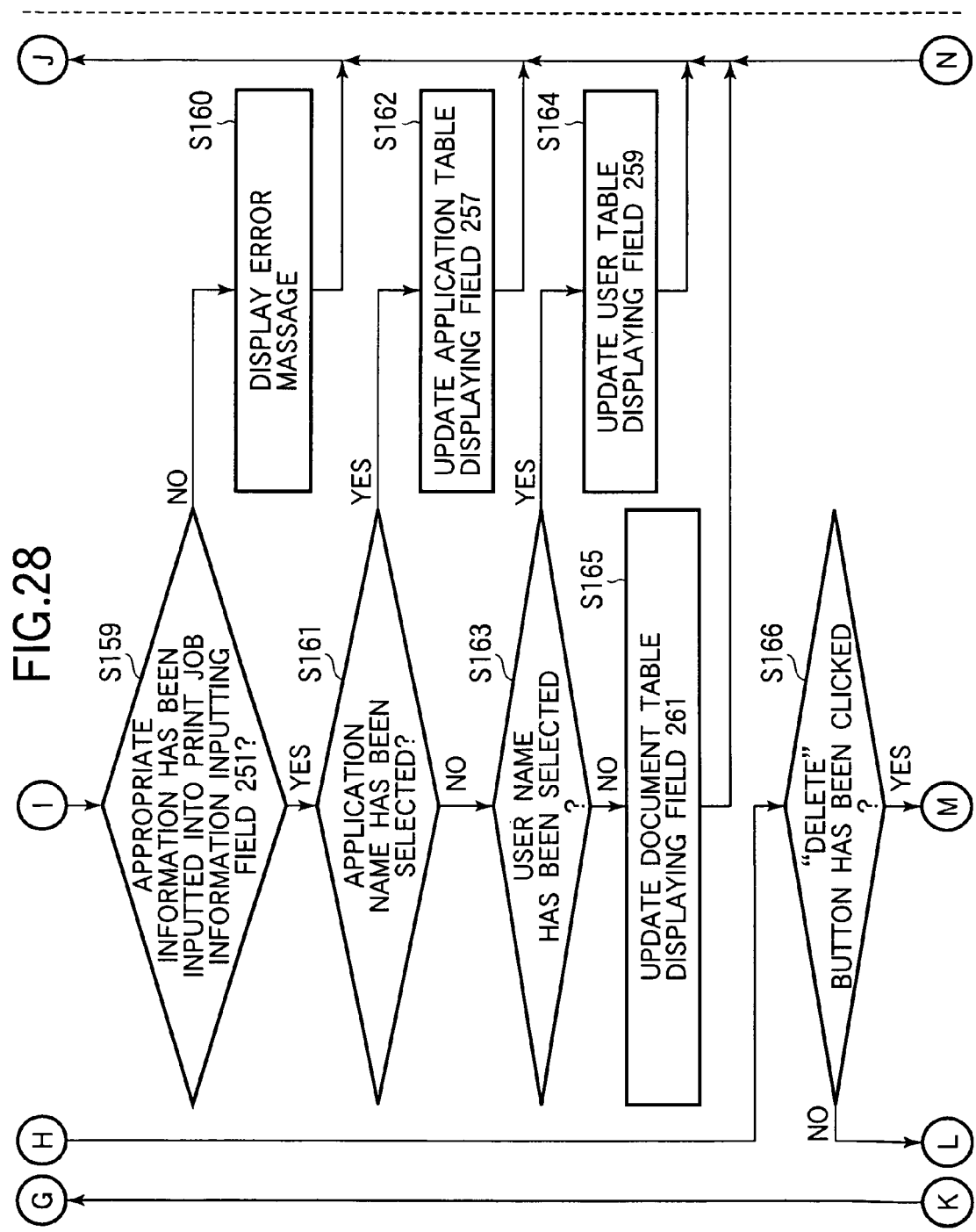
FIG. 28 is a second portion of the flowchart shown in FIG. 27.

FIG. 28 is a second portion of the flowchart shown in FIG. 27.

Figure 29:
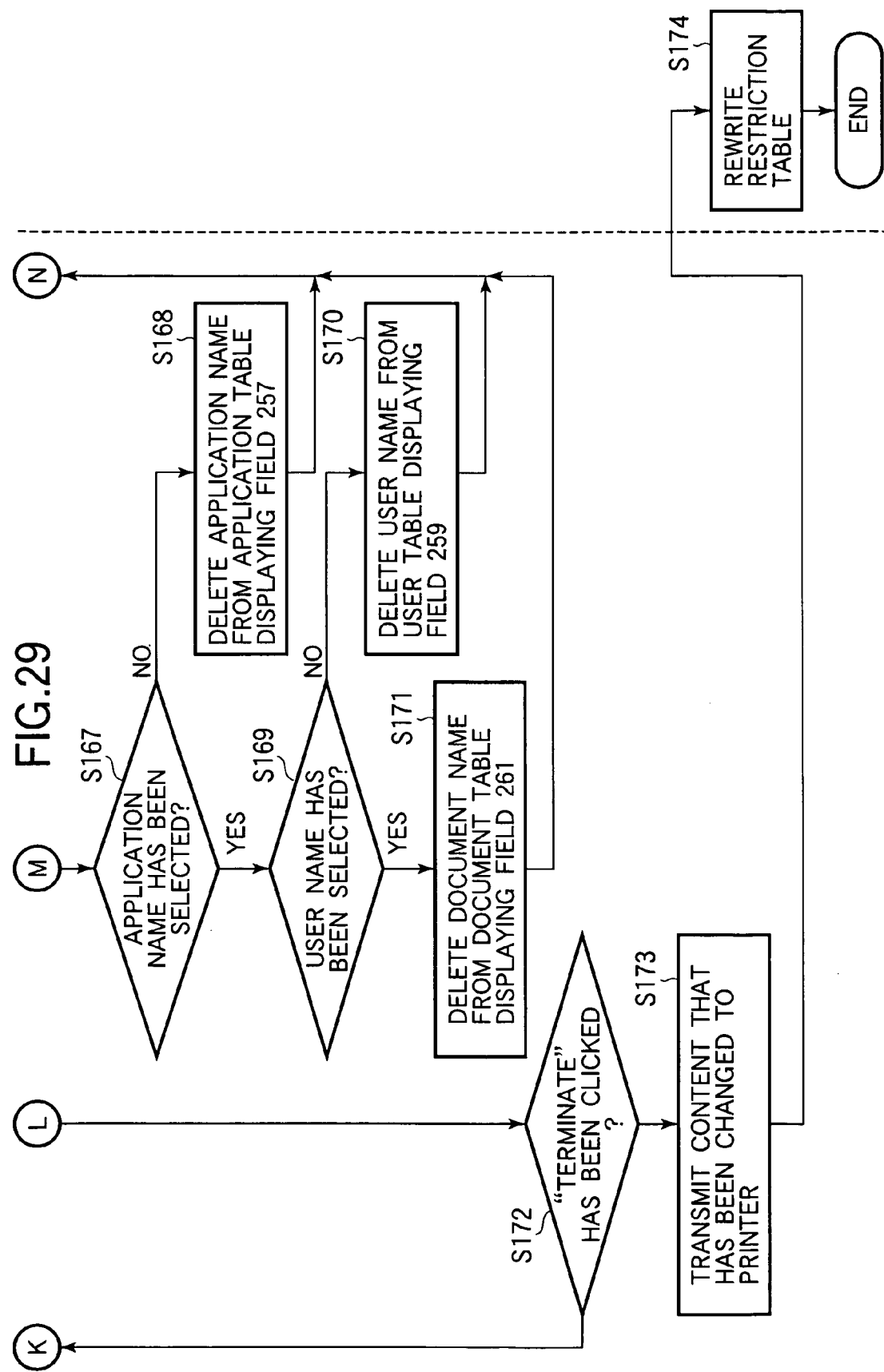
FIG. 29 is a third portion of the flowchart shown in FIG. 27.

FIG. 29 is a third portion of the flowchart shown in FIG. 27.

Figure 30:
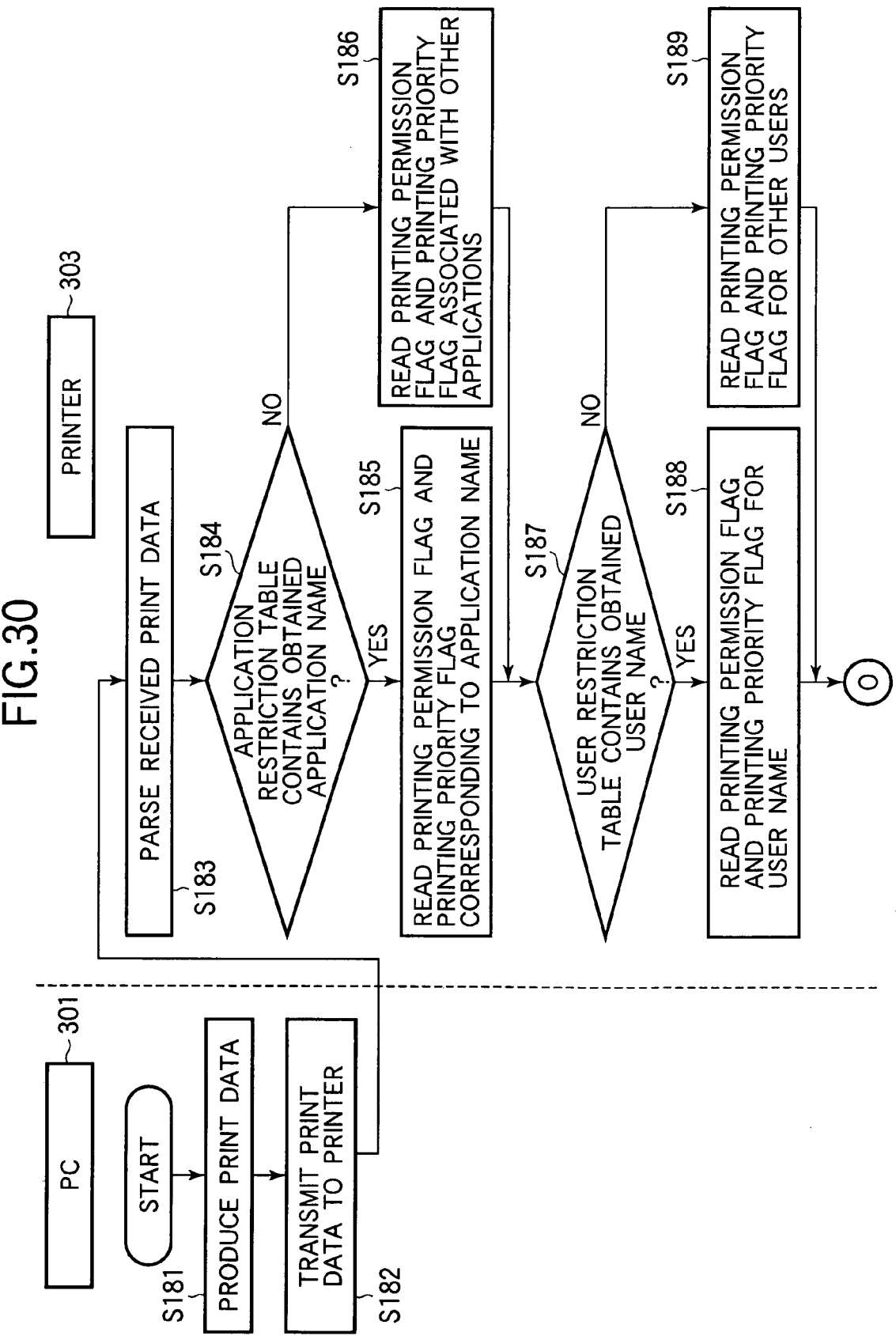
FIG. 30 is a fourth portion of the flowchart shown in FIG. 27.

FIG. 30 is a fourth portion of the flowchart shown in FIG. 27.

Figure 31:
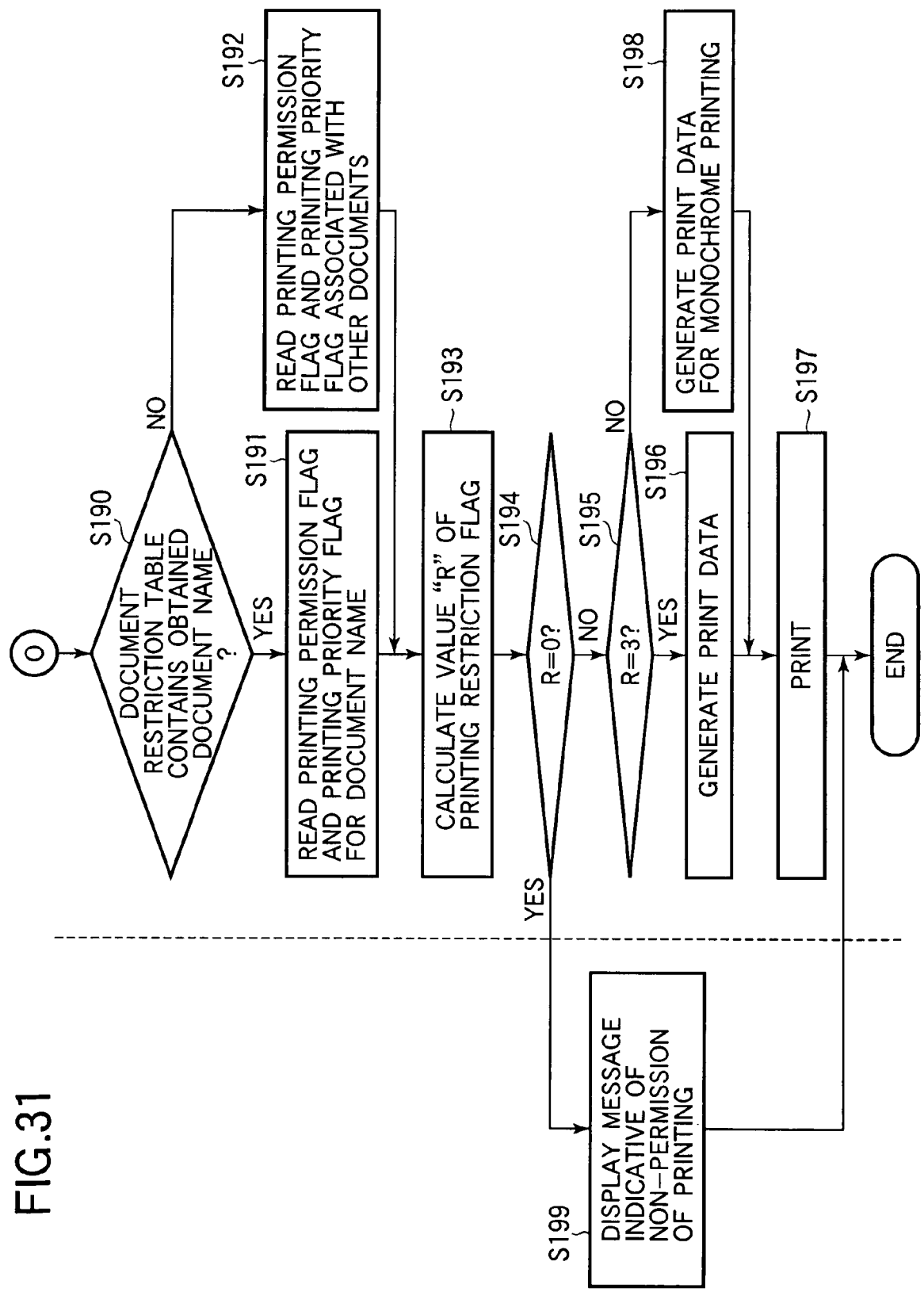
FIG. 31 is a fifth portion of the flowchart shown in FIG. 27.

FIG. 31 is a fifth portion of the flowchart shown in FIG. 27.

A description will be given of the operation of the PC 301 and printer 303 when the restriction table is created or rewritten. The detailed description will be given with reference to FIGS. 27-29.

When the user inputs a predetermined command into the PC 301, the PC 301 sends a request to the printer 303 at step S151 for a restriction table. The printer 303 reads the restriction table from the hard disc 321 at step S152, and sends the restriction table to the PC 301.

At step S153, the PC 301 causes the display device 211 to display a restriction table creating screen. At step S154, the PC 301 reads the restriction table. Then, at step S155, the PC 301 controls the display device 211 to display the restriction table.

Then, the PC 301 makes a decision at step S156 to determine whether a piece of information has been inputted into the input device 209. The step S156 is iterated until some information is inputted. At step S157, the PC 301 modifies the content of the information displayed on the display device 211 in accordance with the information inputted through the input device 209. At step S158, the PC 301 makes a decision to determine whether an "ADD/CHANGE" button has been clicked. If YES at step S158, the PC 301 makes a decision at step S159 to determine whether appropriate information has been inputted into the print job information inputting field 251. If NO at step S159, the PC 301 displays an error message and executes the operations from step S156 onward. If YES at step S159, the PC 301 makes a decision at step S161 to determine whether a radio button 263a for selecting the application name has been selected. If YES at step S161, the PC 301 updates at step S162 the application table displaying field 257. If NO at step S161, the PC 301 makes a decision at step S163 to determine whether a radio button 263b for selecting the user name has been selected. If YES at step S163, the PC 301 updates the user table displaying field 259 at step S164. If NO at step S163, the PC 301 determines that a radio button 263c for selecting document name has been selected, and updates the document table displaying field 261 at step S165. Then, after having rewritten a corresponding table, the PC 301 executes the operations from step S156 onward.

If NO at step S158, the PC 301 makes a decision at step S166 to determine whether a "DELETE" button has been clicked. If YES at step S166, the PC 301 makes a decision at step S167 to determine whether the button 263a for selecting the application name has been selected. If YES at step S167, the PC 301 deletes at step S168 the application name, inputted into the print job information inputting field 251, from the application table displaying field 257. This alleviates the print restriction placed on the application. If NO at step S167, the PC 301 makes a decision at step S169 to determine whether the button 263b for selecting the user name has been selected.

If YES at step S169, the PC 301 deletes at step S170 the user name, inputted into the print job information inputting field 251, from the user table displaying field 259. Also, if NO at step S169, the PC 301 determines that the button 263c for selecting the document name has been selected, and deletes at step S171 the document name, inputted into the print job information inputting field 251, from the document table displaying field 261. After having deleted a corresponding item from a corresponding table, the PC 301 executes the operations from step S156 onward.

If NO at step S166, the PC 301 makes a decision at step S172 to determine whether a "TERMINATE" button has been clicked. If NO at step S172, then the program loops back to step S156.

If YES at step S172, the PC 301 transmits at step S173 the content that has been changed to the printer 303. Then, the printer 303 rewrites at step S174 the restriction table based on the content of the restriction tables that have been changed. This completes the operation.

A detailed description will be given of the operation in which the print data is transmitted to the printer 303. The description will be given with reference to FIGS. 30 and 31.

The PC 301 produces print data at step S181, and then transmits the print data to the printer 303 at step S182.

The printer 303 parses the received print data at step S183, and then makes a decision at step S184 to determine whether the application restriction table 217 contains the obtained application name. If YES at step S184, the printer 303 reads the printing permission flag and printing priority flag corresponding to the application name at step S185. If NO at step S184, the printer 303 reads the printing permission flag and printing priority flag assigned to other applications at step S186. In this manner, the printer 303 obtains the flag indicative of the print restriction of the application name.

The printer 303 makes a decision at step S187 to determine whether the user restriction table 219 contains the obtained user name. If YES at step S187, the printer 303 reads the printing permission flag and printing priority flag for the user name at step S188. If NO at step S187, the printer 303 reads the printing permission flag and printing priority flag assigned to other users at step S189. In this manner, the printer 303 obtains the flag indicative of the print restriction for the user name.

The printer 303 makes a decision at step S190 to determine whether the document restriction table 221 contains the obtained document name. If YES at step S190, the printer 303 reads the printing permission flag and printing priority flag for the document name at step S191. If NO at step S190, the printer 303 reads the printing permission flag and printing priority flag added to another document at step S192. In this manner the printer 303 obtains the flag indicative of print restriction for the document name.

At Step S193, the printer 303 calculates the value R of the print restriction flag indicative of the content of print restriction placed on the print job when the job is printed, the calculation being made based on the obtained printing permission flag and printing priority flag.

The printer 303 makes a decision at step S194 to determine whether the value R of the print restriction flag is "0", thus determining whether printing is permitted. If NO at step S194, the printer 303 makes a decision at step S195 to determine whether the value R of the print restriction flag is "3." If YES at step S195, the printer 303 generates print data at step S196. Since the value R is "3," the printer 303 determines that no print restriction has been placed on the print job, and generates print data based on the color specifying information specified by the user. Then, the printer 303 causes the print engine 325 to print the print data at step S197. This completes the operation of the PC 301 and the printer 303.

If NO at step S195, the printer 303 produces print data for monochrome printing at step S198. Then, the printer 303 prints the print job at step S197.

If YES at step S194, the printer 303 controls the display device 323 to display at step S199 a message indicating that the printing is not permitted. This completes the operations of the PC 301 and the printer 303.

As described above, in the fourth embodiment, the printer 303 stores restriction tables and the printer determines the content of restriction from the restriction tables. Thus, advantages similar to those of the third embodiment may be obtained.

In the third and fourth embodiments, the value R of the restriction flag is calculated based on the sum $S_{PE}$ derived from Equation (1) and the product $P_{PR}$ derived from Equation (2). Alternatively, calculation may be made by using another equation to calculate the level of print restriction.

What is claimed is:

1. An image forming apparatus, comprising:
a memory that stores a plurality of items of print job information registered in advance, each item of print job information including a corresponding plurality of items of sub-information, and each item of the plurality of items of sub-information being assigned a corresponding print restriction level;
a printing format storing section that stores a first printing format in which printing is not restricted, a second printing format in which a print job is printed at a print restriction level assigned to the print job, and a third printing format assigned to a corresponding combination of print restriction levels, each of the print restriction levels being one of the print restriction levels assigned to a corresponding item of sub-information;
an interface that receives a print job from an external apparatus, the print job including print data and selected ones of the plurality of items of sub-information;
a restriction level selecting section configured to obtain the selected ones of the plurality of items of sub-information from the received print job, wherein the restriction level selecting section searches the memory to read print restriction levels from the memory by using the selected ones of the plurality of items of sub-information obtained from the print job;
an alternative printing format informing section that reads the third printing format from the printing format storing section, wherein if a highest one of the print restriction levels read from the memory by the restriction level selecting section indicates that the print job is restricted, then the alternative printing format informing section advises the user of the third printing format; and
a printing section that prints the print data contained in the print job either in the second printing format under the selected highest one of the print restriction levels or in the third printing format if the user accepts the advised third printing format.

2. The image forming apparatus according to claim 1, further comprising an advisor that advises a user of the highest one of the print restriction levels selected by the restriction level selecting section.

3. The image forming apparatus according to claim 1, wherein the print restriction levels are first print restriction levels, wherein the memory further stores second print restriction levels corresponding to the plurality of items of first print job information, the second print restriction levels being either equal to the first print restriction levels or less restrictive than the first print restriction levels; and wherein if a user meets specific requirements, the second print restriction levels override the first restriction levels and the restriction level selecting section selects a print restriction level for the print job based on the second print restriction levels.

4. The image forming apparatus according to claim 1, wherein the plurality of items of print job information include at least a user name, an application name, and a Uniform Resource Locator, and each of the plurality of items of sub-information include one of a user name, an application name, and a Uniform Resource Locator.

5. An image forming apparatus, comprising:

a restriction information storing section that stores a plurality of items of first print job information, first print restriction levels corresponding to the plurality of items of first print job information, and second print restriction levels corresponding to the plurality of items of first print job information;

a print job information obtaining section that obtains a plurality of items of second print job information from a print job;

a restriction determining section that makes a decision as to whether the print job should be printed, the decision being made based on the items of second print job information obtained by the print job information obtaining section, the first print restriction levels, and the second print restriction levels; and printing section that prints print data contained in the print job if the decision is that the print job should be printed;

wherein the restriction determining section implements a logical OR operation to calculate a logical sum of the first print restriction levels assigned to corresponding items of first print job information, then implements a logical AND operation to calculate a first logical product of a first logical product of the second print restriction levels assigned to corresponding items of first print job information, and finally implements a logical AND operation to calculate a second logical product of the logical sum and the first logical product, wherein the restriction determining section makes a decision based on the second product as to whether the print job should be printed.

* * * * *